(12) United States Patent
Liang et al.

(10) Patent No.: US 9,385,364 B2
(45) Date of Patent: Jul. 5, 2016

(54) CARBON-DEPOSITED ALKALI METAL OXYANION ELECTRODE MATERIAL AND PROCESS FOR PREPARING SAME

(71) Applicant: JOHNSON MATTHEY PUBLIC LIMITED COMPANY, London (GB)

(72) Inventors: Guoxian Liang, St-Hyacinthe (CA); Jasmin Dufour, Lemoyne (CA); Michael Holzapfel, Freising (DE); Christophe Michot, Montreal (CA)

(73) Assignee: JOHNSON MATTHEY PUBLIC LIMITED COMPANY, London (GB)

( * ) Notice: Subject to any disclaimer, the term of this patent is extended or adjusted under 35 U.S.C. 154(b) by 0 days.

(21) Appl. No.: 14/471,454

(22) Filed: Aug. 28, 2014

(65) Prior Publication Data

US 2014/0370186 A1 Dec. 18, 2014

Related U.S. Application Data

(63) Continuation of application No. 13/294,853, filed on Nov. 11, 2011, now abandoned.

(60) Provisional application No. 61/412,547, filed on Nov. 11, 2010.

(51) Int. Cl.
*H01M 4/04* (2006.01)
*H01M 4/1397* (2010.01)
*H01M 4/58* (2010.01)
(Continued)

(52) U.S. Cl.
CPC ............ *H01M 4/049* (2013.01); *H01M 4/0416* (2013.01); *H01M 4/0471* (2013.01); *H01M 4/1397* (2013.01); *H01M 4/366* (2013.01); *H01M 4/5825* (2013.01); *H01M 4/136* (2013.01); *H01M 4/625* (2013.01); (Continued)

(58) Field of Classification Search
CPC ..... H01M 4/485; H01M 4/625; H01M 4/131; B82Y 30/00; H01B 1/06
USPC ........................... 252/506, 507, 509; 427/122
See application file for complete search history.

(56) References Cited

U.S. PATENT DOCUMENTS 3,518,128 A * 6/1970 Takahashi et al. ............ 148/545
7,815,888 B2 10/2010 Hatta et al.
(Continued)

FOREIGN PATENT DOCUMENTS

JP 2005-522009 7/2005
JP 2006-511907 4/2006
(Continued)

OTHER PUBLICATIONS

Won Bin Im, Byung Won Cho, Hyung-Sun Kim, Hee Lack Choi, Hae Young Jung, Kyung yoon Chung. "A Study on the ZrO2 Coating Effect on the Electrochemical Performance If LiNi0.5Mn1.5O4". 2010. The Electrochemical Society. 1 Page Total.*

Primary Examiner — Mark Kopec
Assistant Examiner — Danny N Kang
(74) Attorney, Agent, or Firm — Young & Thompson

(57) ABSTRACT

The present invention relates to a process for the synthesis of a carbon-deposited alkali metal oxyanion cathode material comprising particles, wherein said particles carry, on at least a portion of the particle surface, carbon deposited by pyrolysis, said process comprising a dry high-energy milling step performed on precursors of said carbon-deposited alkali metal oxyanion prior to a solid-state thermal reaction.

20 Claims, 11 Drawing Sheets

(51) Int. Cl.
  *H01M 4/36* (2006.01)
  *H01B 1/06* (2006.01)
  *H01M 4/136* (2010.01)
  *H01M 10/0525* (2010.01)
  *H01M 4/62* (2006.01)

(52) U.S. Cl.
  CPC .......... *H01M10/0525* (2013.01); *Y02E 60/122* (2013.01); *Y02P 70/54* (2015.11)

(56) References Cited

U.S. PATENT DOCUMENTS 8,318,352 B2  11/2012  Saidi et al.

| 2002/0195591 A1* | 12/2002 | Ravet et al. ................ 252/500 |
|---|---|---|
| 2008/0153002 A1 | 6/2008 | Nazar et al. |
| 2011/0049418 A1* | 3/2011 | Dahn et al. ................ 252/182.1 |
| 2012/0003537 A1 | 1/2012 | Ohira et al. |
| 2015/0132660 A1 | 5/2015 | Ravet et al. |

FOREIGN PATENT DOCUMENTS

| JP | 2008-186807 | 8/2008 |
|---|---|---|
| JP | 2009-170401 | 7/2009 |
| JP | 4297429 | 7/2009 |
| JP | 2010-044890 | 2/2010 |
| JP | 2010-524820 | 7/2010 |
| JP | 2012-014987 | 1/2012 |

\* cited by examiner

CARBON-DEPOSITED ALKALI METAL OXYANION ELECTRODE MATERIAL AND PROCESS FOR PREPARING SAME

CROSS REFERENCE TO RELATED APPLICATIONS

This application is a continuation of U.S. patent application Ser. No. 13/294,853, filed on Nov. 11, 2011, which claims the benefit of U.S. Provisional Patent Application No. 61/412,547 filed on Nov. 11, 2010, and which are each incorporated by reference in their entirety herein for any and all purposes.

BACKGROUND OF THE INVENTION

1. Field of the Invention

The present invention relates to the field of electrode materials, and more specifically, to a carbon-deposited alkali metal oxyanion electrode material as well as to a process for preparing same.

2. Description of the Related Art

Positive electrodes of lithium-ion battery generally comprise an electrochemically active cathode material, a binder and carbon particles which act as an electronically conductive additive. During battery cycling, it has been observed that such positive electrodes generally show a deleterious increase in electrode resistance. It has been proposed that as the number of cycles increases, the cathode material exhibits unit lattice volume expansion/shrinkage variations that are due to insertion/deinsertion of alkali cation in the cathode material. It is believed that these variations induce a loss of electronically conductive network contact with the cathode material and/or breaking of cathode material particles. As a result, the battery's capacity decreases and the battery has a resulting shorter life span.

To address this problem, it has been proposed to fine-tune the composition of cathode materials in order to reduce the observed change of unit cell volume concomitant to alkali cation insertion/deinsertion.

WO 2009/096255 (assigned to Sharp Kabushiki Kaisha), which is incorporated herein by reference in its entirety, describes a $Li_yK_aFe_{1-x}X_xPO_4$ cathode material with reduced change of the unit cell volume, where X represents at least one element selected from group 2 to 13 elements; a and x are $0<a\leq0.25$ and $0\leq x\leq0.25$, respectively; and y is (1−a).

WO 2010/134579 (assigned to Sharp Kabushiki Kaisha), which is incorporated herein by reference in its entirety, describes an alkali metal phosphosilicate material of general formula $LiFe_{1-x}M_xP_{1-y}Si_yO_4$ where the average valency of Fe is +2 or greater; M is an element having a valency of +2 or greater and is at least one selected from the group consisting of Zr, Sn, Y and Al; the valency of M and the average valency of Fe are different; $0<x\leq0.5$; and y=x*(valency of M−2)+(1−x)*(average valency of Fe−2).

JP 2011/77030 (assigned to Sharp Corp. and Kyoto University), which is incorporated herein by reference in its entirety, describes an alkali metal phosphosilicate material of general formula $Li_{(1-a)}A_aFe_{(1-x-b)}M_{(x-c)}P_{(1-y)}Si_yO_4$ where A is at least one kind selected from a group consisting of Na, K, Fe and M. Average valence of Fe is +2 or more, M is an element of valence of +2 or more, and at least one kind selected from a group consisting of Zr, Sn, Y and Al, the average valence of M and the average valence of Fe are different from each other, $0<a\leq0.125$, the total number of moles of Na and K in A is d, number of moles of Fe in A is b, number of moles of M in A is c, a=b+c+d, $0<x\leq0.5$, and $0<y\leq0.5$.

SUMMARY OF THE INVENTION

In one broad aspect, the present invention relates to carbon-deposited alkali metal oxyanion cathode materials and to a process for obtaining same.

In another broad aspect, the present invention relates to a process for the synthesis of a carbon-deposited alkali metal oxyanion electrode material, which includes at least one thermal step, where a dry high-energy milling step of the carbon-deposited alkali metal oxyanion electrode material precursors is performed prior to the at least one thermal step.

In yet another broad aspect, the present invention relates to a process for the synthesis of a carbon-deposited alkali metal oxyanion cathode material comprising particles, where the particles carry, on at least a portion of the particle surface, carbon deposited by pyrolysis, the process comprising: a first dry high-energy milling step on precursors of the carbon-deposited alkali metal oxyanion prior to a first solid-state thermal reaction to produce a first solid-state thermal reaction product; and a second dry high-energy milling step on the product prior to a second solid-state thermal reaction.

These and other aspects and features of the present invention will now become apparent to those of ordinary skill in the art upon review of the following description of specific embodiments of the invention in conjunction with the accompanying figures.

BRIEF DESCRIPTION OF THE FIGURES

A detailed description of examples of implementation of the present invention is provided hereafter, by way of example only, with reference to the accompanying figures, in which.

DESCRIPTION OF ILLUSTRATIVE EMBODIMENTS

Figure 1:
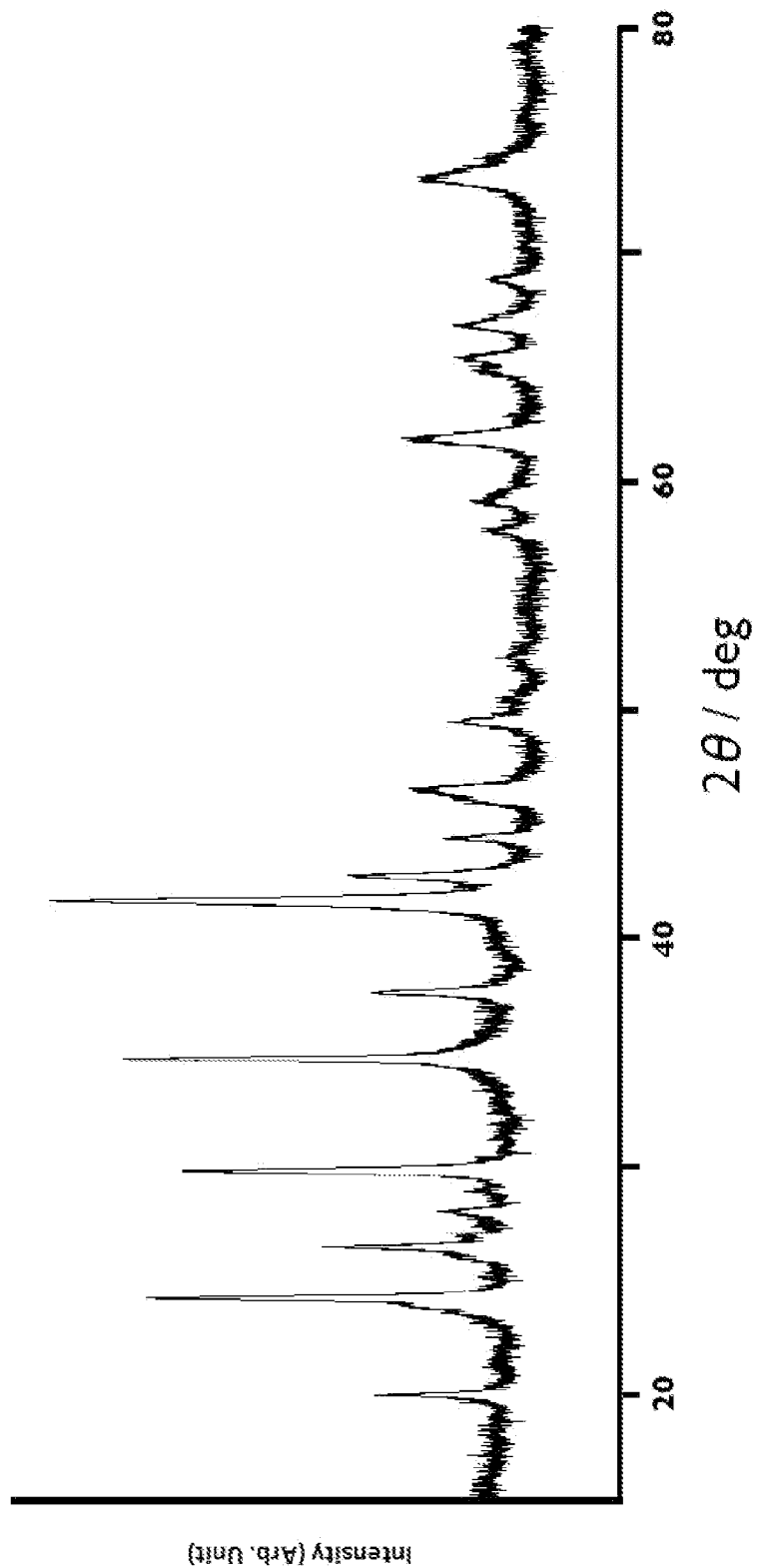
FIG. 1 represents the XRD spectrum (CoKα) of carbon-deposited lithium iron zirconium phosphosilicate, obtained from $FePO_4$, iron oxalate, $Li_2CO_3$, $Si(OC_2H_5)_4$, Zr(IV) acetate hydroxide, at an atomic ratio Li:Fe:Zr:P:Si=1:0.9:0.1:0.8:0.2, as prepared in example 1. Unit cell volume calculated from XRD data is 291 Å$^3$ comparatively to 291 Å$^3$ for C—LiFePO$_4$.

The present inventors have surprisingly and unexpectedly discovered, during an R&D project initiated to synthesize a specific carbon-deposited alkali metal phosphosilicate, C—$LiFe_{0.9}Zr_{0.01}(PO_4)_{0.9}(SiO_4)_{0.1}$, that known processes for obtaining carbon-deposited alkali metal oxyanion, such as those reported for the specific case of C—$LiFePO_4$, e.g. wet-process, solid-state thermal process, polyol process, etc. produce low-quality materials.

The present invention relates to carbon-deposited alkali metal oxyanion cathode materials and to a process for obtaining same. In one non-limiting embodiment, the carbon-deposited alkali metal oxyanion cathode material of the present invention enables one to obtain a cathode having such properties that prevents and/or minimizes the expansion/shrinkage of the cathode. It is thus possible to prevent/minimize the internal resistance of the battery from increasing as the number of charging/discharging cycles increases. It is therefore possible to produce a cathode active material which allows production of a battery which not only excels in terms of safety and cost, but also has a longer life.

In one non-limiting embodiment, the present invention relates to a process for the synthesis of a carbon-deposited alkali metal oxyanion electrode material, which includes at least one thermal step and a dry high-energy milling step of reactants performed prior to the at least one thermal step.

In another non-limiting embodiment, the present invention relates to a process for the synthesis of a carbon-deposited alkali metal oxyanion electrode material, which includes a first dry high-energy milling step of the carbon-deposited alkali metal oxyanion electrode material precursors that is performed prior to a first thermal step, and includes a second dry high-energy milling step of the product obtained after the first thermal step, where the second high-energy milling step is performed prior to a second thermal step.

In another non-limiting embodiment, the process includes a step of pyrolysis of a source of carbon for obtaining a carbon deposit onto the alkali oxyanion material and/or its precursors. In one non-limiting embodiment, the pyrolysis can be performed during the herein described first thermal step and/or second thermal step. In another non-limiting embodiment, an optional flash pyrolysis is performed after the synthesis reaction to improve carbon deposit graphitization.

The deposit of carbon can present a more or less uniform, adherent and non-powdery deposit. In one non-limiting embodiment, the carbon deposit represents up to 15% by weight, with respect to the total weight of the material. In another embodiment, the carbon deposit represents from 0.5 to 5% by weight with respect to the total weight of the material. Deposition of carbon by pyrolysis of a carbon source can be performed on the end product and/or on its precursors as described, for instance, in WO 02/027824, WO 02/027823, CA 2,307,119, WO 2011/072397, US 2002/195591 and US 2004/157126, which are incorporated herein by reference in their entirety.

In a non-limiting implementation, performed at an industrial scale, the process of the invention can be carried out continuously or in batch, in a reactor selected from rotary kilns, push kilns, fluidized beds, belt-driven kilns, that allow control of the composition and the circulation of the gaseous atmosphere. Utilization of large batch kiln, such as baking kiln, is not excluded. The person skilled in the art will be able to identify any alternative suitable alternative reactors or any from the above without departing from the present invention.

In mechanochemistry, the term "high-energy milling" is usually used in order to stress the character of applied milling equipments (mills) used for preparation of micro- and nano-sized solids. (See, e.g., P. Balaz, Mechanochemistry in Nanoscience and Minerals Engineering, Chapter 2, Springer-Verlag Berlin Heidelberg 2008; De Castro and Mitchell, Synthesis, Functionalization and surface treatment of nanoparticles, Chapter 1, American Scientific Publishers 2002; Zoz, Ren, Reichardt and Benz, High Energy Milling/Mechanical Alloying/Reactive Milling, Zoz GmbH, available on Zoz website at "http://www.zoz-group.de/zoz.engl/zoz-.main/pdf content/publications/v14.pdf"—which are each incorporated herein by reference in their entirety).

High-energy milling of the precursors, can be performed with a large choice of equipments, for example without any limitation, high-energy ball mills, pulverizing mixer mills, planetary ball mills, drum/ball-mills, shaker mills, stirred ball mills, mixer ball mills, vertical and horizontal attritors, and equivalent milling equipments. The person skill in the art is able to identify suitable equipments without undue experimentation and without departing from the present invention. High-energy milling equipments are commercially available, for example but without any limitation, from SPEX CertiPrep Group L.L.C. (8000M Mixer/Mill®, etc.), Zoz GmbH (Simoloyer®), Retsch GmbH (Planetary Ball Mill PM 200/400/400 MA) and Union Process Inc. (Attritor®).

In one non-limiting embodiment, the high-energy milling equipment is selected to avoid contamination of reactants, especially metallic contamination. To perform metal-free grinding, milling parts of the equipment are preferably made of ceramics, or coated with ceramics, for example, without any limitation, alumina, zirconium silicate, zirconia, yttria or ceria stabilized zirconia, silicium nitride, tungsten carbide or silicium carbide. The person skill in the art is able to identify any alternative suitable milling parts of the equipment or any from the above without departing from the present invention.

In one non-limiting embodiment, the high-energy milling is high-energy ball milling.

In one non-limiting embodiment, the process of the invention includes a first solid-state thermal step operated at a temperature selected from the following temperature ranges of between about 200° C. and about 600° C., about 250° C. and about 600° C., about 275° C. and about 600° C., about 300° C. and about 600° C., about 325° C. and about 600° C., about 350° C. and about 600° C., or about 375° C. and about 600° C., or about 400° C. and about 600° C., or about 200° C. and about 500° C., or about 250° C. and about 450° C., or about 300° C. and about 400° C. The person skilled in the art will be able to select any alternative suitable temperature or any temperature falling within any of the ranges above without departing from the spirit of the invention.

In one non-limiting embodiment, the process of the invention includes a second solid-state thermal step operated at a temperature selected from the following temperature ranges of between about 400° C. and about 800° C., about 450° C. and about 800° C., about 500° C. and about 800° C., about 525° C. and about 800° C., about 550° C. and about 800° C., or about 575° C. and about 800° C., or about 600° C. and about 800° C., or about 400° C. and about 700° C., or about 450° C. and about 650° C., or about 500° C. and about 600° C. The person skilled in the art will be able to select any alternative suitable temperature or any temperature falling within any of the ranges above without departing from the spirit of the invention.

In one non-limiting embodiment, the process of the invention includes a first high-energy milling step that is performed during a time period selected from the following time ranges of between about 5 minutes to about 4 hours, about 10 minutes to about 4 hours, about 30 minutes to about 4 hours, about 60 minutes to about 4 hours, about 90 minutes to about 4 hours, about 120 minutes to about 4 hours, about 150 minutes to about 4 hours, about 180 minutes to about 4 hours, about 210 minutes to about 4 hours, or about 230 minutes to about 4 hours. The person skilled in the art will be able to select any alternative suitable time period or any time period falling within any of the ranges above without departing from the spirit of the invention.

In one non-limiting embodiment, the process of the invention includes a second high-energy milling that is performed during a time period selected from the following time ranges of between about 5 minutes to about 4 hours, about 10 minutes to about 4 hours, about 30 minutes to about 4 hours, about 45 minutes to about 4 hours, about 60 minutes to about 4 hours, about 90 minutes to about 4 hours, about 120 minutes to about 4 hours, about 150 minutes to about 4 hours, about 180 minutes to about 4 hours, about 210 minutes to about 4 hours, or about 230 minutes to about 4 hours. The person skilled in the art will be able to select any alternative suitable time period or any time period falling within any of the ranges above without departing from the spirit of the invention.

In one non-limiting embodiment, the process of the invention includes a subsequent flash thermal treatment on the oxyanion end-product in order to improve the graphitization of carbon deposit while avoiding partial decomposition of the oxyanion. The flash thermal treatment can be operated at a temperature selected from the following temperature ranges of between about 650° C. and about 900° C., about 700° C. and about 900° C., about 750° C. and about 900° C., about 800° C. and about 900° C., or about 825° C. and about 900° C., or about 850° C. and about 900° C. The person skilled in the art will be able to select any alternative suitable temperature or any temperature falling within any of the ranges above without departing from the spirit of the invention.

The flash thermal treatment can be operated during a period of time selected from the following time ranges of between about 10 seconds and about ten minutes, about 30 seconds and about ten minutes, about one minute and about ten minutes, about two minutes and about ten minutes, about three minutes and about ten minutes, about four minutes and about ten minutes, or about five minutes and about ten minutes. The person skilled in the art will be able to select any alternative suitable time period or any time period falling within any of the ranges above without departing from the spirit of the invention.

In one non-limiting embodiment, the herein described high-energy milling step produces a substantially amorphous product. The substantially amorphous product then becomes a substantially crystalline product after the herein described thermal reaction performed at a sufficiently high temperature. The person skilled in the art will be able to select a suitable temperature without departing from the invention.

In one non-limiting embodiment, the herein described first thermal reaction and/or second high-energy milling step produces a substantially amorphous product, which then becomes a substantially crystalline product after the herein described second thermal reaction which is performed at a sufficiently high temperature. The person skilled in the art will be able to select a suitable temperature without departing from the invention.

In one non-limiting embodiment, the herein described oxyanion is a phosphosilicate.

In one non-limiting embodiment, the process of the invention includes reacting precursors of a carbon-deposited alkali metal phosphosilicate cathode material, where the precursors comprise:
a) at least one source compound of an alkali metal;
b) at least one source compound of a metal M selected from Fe and/or Mn;
c) at least one source compound of a metal M', where M' in the final product is a 2+ or more metal;

d) at least one source compound of P, if the element P is not present in another source compound; and e) at least one source compound of Si, if the element Si is not present in another source compound.

f) at least one source compound of carbon.

In one non-limiting embodiment, the source compound of carbon is present prior to the herein described first thermal step and/or prior to the herein described second thermal step.

In one non-limiting embodiment, the herein described source compounds are totally present for the herein described first thermal step, or any part thereof is present for each of the herein described first and second thermal step. In other words, the person skilled in the art will understand that the process may include addition of one or more of the herein described source compound during/prior to the second high-energy milling and/or second thermal step.

In one non-limiting embodiment the source compound b) is partially replaced by at most 15% of: one or more other metals selected from Ni and Co, and/or atoms of one or more aliovalent or isovalent metals other than Ni or Co, and/or atoms of Fe(III).

In another non-limiting embodiment the source compound b) is partially replaced by at most 15% of: one or more other metals chosen from Ni and Co, and/or by one or more aliovalent or isovalent metals selected from the group consisting of Mg, Mo, Mn, V, Pb, Sn, Nb, Ti, Al, Ta, Ge, La, Y, Yb, Cu, Ag, Sm, Ce, Hf, Cr, Zr, Bi, Zn, Ca, B and W, and/or atoms of Fe(III).

In the present invention, the "one or more metal" described herein is readily understood by the person skilled in the art as being one or more metal of those metals which are suitable in the art of batteries. For example, but without being limited thereto, the "one or more metal" described herein may be selected from any metal included in the 2, 3, 4, 5, or 6 periods from the periodic table that are suitable in the art of batteries without departing from the invention. In another example, but without being limited thereto, the "one or more metal" described herein may be selected from at least one element selected from group 2 to 13 elements. In another example, but without being limited thereto, the "one or more metal" described herein may be selected from Mg, Mo, Mn, V, Co, Ni, Pb, Sn, Nb, Ti, Al, Ta, Ge, La, Y, Yb, Cu, Ag, Sm, Ce, Hf, Cr, Zr, Bi, Zn, Ca, B and W. The person skilled in the art will be able to select any alternative suitable "one or more other metal" or any from the above without departing from the present invention.

In one non-limiting embodiment, the carbon-deposited alkali metal phosphosilicate of the invention is characterized in that a cathode material containing this material exhibits reduced change of the unit cell (lattice) volume concomitant to alkali cation insertion/deinsertion. In one aspect, the reduction of the unit cell (lattice) volume change can be characterized by the volume change of the de-cationated (e.g. delithiated) product versus the cationated (e.g. lithiated) product. In one non-limiting embodiment, the unit (lattice) volume of a given product can be evaluated by an XRD measurement of the product. In one non-limiting implementation of this concept, the present inventors measured the increase in unit (lattice) cell volume of a given product relatively to the unit (lattice) cell volume of C—LiFePO$_4$ as a parameter to evaluate the performance of a given synthesis process. For example, an end-product with an unsuitable increase in unit cell volume was characterized as representing a cathode material of low purity and/or inadequate substitution and/or presence of the M' in the phosphosilicate matrix.

In one non-limiting embodiment, the source compound a) is an alkali compound selected, for example, from the group consisting of lithium oxide, sodium oxide, lithium hydroxide, sodium hydroxide, potassium hydroxide, lithium carbonate, sodium carbonate, potassium carbonate, Li$_3$PO$_4$, Na$_3$PO$_4$, K$_3$PO$_4$, the hydrogen phosphate LiH$_2$PO$_4$, LiNaHPO$_4$, LiKHPO$_4$, NaH$_2$PO$_4$, KH$_2$PO$_4$, Li$_2$HPO$_4$, lithium, sodium or potassium ortho-, meta- or polysilicates, lithium sulfate, sodium sulfate, potassium sulfate, lithium oxalate, sodium oxalate, potassium oxalate, lithium acetate, sodium acetate, potassium acetate and one of their mixtures. The person skilled in the art will be able to select any alternative suitable source compound a) or any from the above without departing from the spirit of the invention.

In one non-limiting embodiment, the source compound b) comprise a compound selected, for example, from iron, iron (III) oxide or magnetite, trivalent iron phosphate, lithium iron hydroxyphosphate or trivalent iron nitrate, ferrous phosphate, hydrated or nonhydrated, vivianite Fe$_3$(PO$_4$)$_2$, iron acetate (CH$_3$COO)$_2$Fe, iron sulfate (FeSO$_4$), iron oxalate, iron(III) nitrate, iron(II) nitrate, FeCl$_3$, FeCl$_2$, FeO, ammonium iron phosphate (NH$_4$FePO$_4$), Fe$_2$P$_2$O$_7$, ferrocene or one of their mixtures; and/or manganese, MnO, MnO$_2$, manganese acetate, manganese oxalate, Mn(III) acetylacetonate, Mn(II) acetylacetonate, Mn(II) chloride, MnCO$_3$, manganese sulfate, manganese nitrate, manganese phosphate, manganocene or one of their mixtures. The person skilled in the art will be able to select any alternative suitable source compound b) or any from the above without departing from the spirit of the invention.

In one non-limiting embodiment, the source compound c) is a source compound of a metal which in the final product is a metal having a valency of 2+ or more. For example, it is a source compound of a metal selected from the group consisting of Zr$^{4+}$, Ti$^{4+}$, Nb$^{4+}$, Mo$^{4+}$, Ge$^{4+}$, Ce$^{4+}$ and Sn$^{4+}$, and/or a source compound a metal selected from the group consisting of Al$^{3+}$, Y$^{3+}$, Nb$^{3+}$, Ti$^{3+}$, Ga$^{3+}$, Cr$^{3+}$ and V$^{3+}$, and/or a source compound a metal selected from the group consisting of Ta$^{5+}$ and Nb$^{5+}$, and/or a source compound a metal selected from the group consisting of Zn$^{2+}$ and Ca$^{2+}$. For example, in the specific case of a source compound of a valency 2+, the source compound c) may be selected from zinc acetate, zinc chloride, zinc acetylacetonate, zinc nitrate, zinc sulfate, zinc stearate, calcium carbonate, calcium hydroxide, calcium acetate, or a mixture thereof. For example, in the specific case of a source compound of valency 3+, the source compound c) may be selected from yttrium(III) 2-ethylhexanoate, yttrium (III) acetate, yttrium(III) acetylacetonate, yttrium(III) nitrate, aluminum acetate, aluminum isopropoxide, aluminum acetylacetonate, aluminum ethoxide, aluminum metaphosphate, aluminum monostearate, or a mixture thereof. For example, in the specific case of a source compound of valency 4+, the source compound c) may be selected from zirconium acetate hydroxide, zirconium alkoxide, zirconium(IV) acetylacetonate, zirconium(IV) ethoxide, zirconium(IV) hydrogenphosphate, zirconium(IV) silicate, titanium(IV) 2-ethylhexyloxide, titanium(IV) butoxide, germanium(IV) ethoxide, tin(IV) acetate, or a mixture thereof. For example, in the specific case of a source compound of valency 5+, the source compound c) may be selected from tantalum(V) butoxide, niobium(V) ethoxide, niobium(V) phenoxide, or a mixture thereof. The person skilled in the art will be able to select any alternative suitable source compound c) or any from the above without departing from the spirit of the invention.

In one non-limiting embodiment, the source compound d) is a compound of phosphorus selected, for example, from phosphoric acid and its esters, M$_3$PO$_4$ wherein M is at least one selected from Li, Na and K, the hydrogen phosphate MH$_2$PO$_4$ wherein M is at least one selected from Li, Na and K, monoammonium or diammonium phosphates, trivalent iron phosphate or manganese ammonium phosphate ($NH_4MnPO_4$), $MnHPO_4$, $Fe_2P_2O_7$. The person skilled in the art will be able to select any alternative suitable source compound d) or any from the above without departing from the spirit of the invention.

In one non-limiting embodiment, the source compound e) is a compound of silicon selected, for example, from organosilicon, silicon alkoxides, tetraethyl orthosilicate, nanosized $SiO_2$, $Li_2SiO_3$, $Li_4SiO_4$ or a mixture thereof. The person skilled in the art will be able to select any alternative suitable source compound e) or any from the above without departing from the spirit of the invention.

In one non-limiting embodiment, a subset or all of the source compounds a) to e) can also be additionally a source of oxygen and/or a source of at least two elements.

The person skilled in the art will be able to determine the ratios required for each of the source compound depending on the desired carbon-deposited alkali metal oxyanion product without departing from the spirit of the invention. For example, in the case of a carbon-deposited alkali metal phosphosilicate product, the source compounds are selected to provide a cathode material having alkali metal:M:M':P:Si ratios of about 1:0.7 to 1:>0 to 0.3:>0.7 to 1:>0 to 0.3, where ">0" does not include 0, rather it means "more than 0".

The deposition of carbon on the surface of the alkali metal oxyanion or its precursors is obtained by pyrolysis of the source compound of carbon f). The deposition of carbon at the surface of the oxyanion or its precursors can be obtained by thermal decomposition or transformation of highly varied source compounds of carbon. In one non-limiting embodiment, the source compound of carbon is a compound which is in the liquid state or in the gas state, a compound which can be used in the form of a solution in liquid solvent, or a compound which changes to the liquid or gas state during its thermal decomposition or transformation, so as to more or less coat the compounds in the mixture. The source compound of carbon can, for example, be chosen from liquid, solid or gaseous hydrocarbons and their derivatives (in particular polycyclic aromatic entities, such as tar or pitch), perylene and its derivatives, polyhydric compounds (for example, sugars and carbohydrates, and their derivatives), polymers, cellulose, starch and their esters and ethers, fatty acid salts (for example stearic, oleic acid or lithium stearate), fatty acid esters, fatty alcohol esters, alkoxylated alcohols, alkoxylated amines, fatty alcohol sulfate or phosphate esters, imidazolium and quaternary ammonium salts, ethylene oxide/propylene oxide copolymer, ethylene oxide/butylene oxide copolymer and their mixtures. Mention may be made, as examples of polymers, of polyolefins, polyethylene, polypropylene, polybutadienes, polyvinyl alcohol, condensation products of phenols (including those obtained from reaction with aldehydes), polymers derived from furfuryl alcohol, from styrene, from divinylbenzene, from naphthalene, from perylene, from acrylonitrile and from vinyl acetate. A non-limiting example is Unithox™ 550 ethoxylate (Baker Hughes). Unithox™ ethoxylates are nonionic emulsifiers and wetting agents with high molecular weights and melt points. These Baker Petrolite ethoxylated products are produced from Unilin™ alcohols which are fully saturated, long chain, linear, $C_{20}$ to $C_{50}$, synthetic alcohols. The person skilled in the art will be able to select any alternative suitable source compound of carbon or any from the above without departing from the spirit of the invention.

In one non-limiting embodiment, any of the herein described process steps are performed under an inert atmosphere such as, without any limitation, nitrogen, argon, and/or helium. In one non-limiting embodiment, any of the herein described thermal steps is performed under a humidified atmosphere, for example as described in WO 2011/072397, which is incorporated herein in its entirety.

In one non-limiting embodiment, any of the herein described process steps are performed under a reductive atmosphere which participates in the reduction and/or prevents the oxidation of the oxidation state of at least one metal in the precursors without full reduction to an elemental state. For example, the reductive atmosphere is present during the first high-energy milling step, the second high-energy milling step, the first thermal step, the second thermal step, or any combinations thereof.

In one non-limiting embodiment, the reductive atmosphere is, but without being limited thereto, an externally applied reductive atmosphere, a reductive atmosphere derived from the degradation of a source compound, or a reductive atmosphere derived from the synthesis reaction.

In one non-limiting embodiment, the above externally applied reductive atmosphere comprises a gas such as, but without being limited thereto, CO, $H_2$, $NH_3$, HC, and any combinations thereof, which participates in the reduction or prevents the oxidation of the oxidation state of at least one metal in the precursors without full reduction to an elemental state and where HC refers to any hydrocarbon or carbonaceous product in gas or vapor form. The externally applied reductive atmosphere can also comprise an inert gas such as, but without being limited thereto, $CO_2$, $N_2$, argon, helium, nitrogen or other inert gases.

In one non-limiting embodiment, the above reductive atmosphere derived from the degradation of a source compound is, but without being limited thereto, a reductive atmosphere which is produced when the source compound is degraded or is transformed during a thermal step.

In one non-limiting embodiment, this compound is a reducing agent source which is degraded or is transformed during the thermal step and produces a reductive atmosphere which participates in the reduction or prevents the oxidation of the oxidation state of at least one metal in the precursors without full reduction to an elemental state. In one non-limiting embodiment, this reductive atmosphere comprises CO, $CO/CO_2$, $H_2$, or any combinations thereof.

In one non-limiting embodiment, the above reductive atmosphere derived from the synthesis reaction is, but without being limited thereto, a reductive atmosphere that is produced during a thermal step, and which participates in the reduction or prevents the oxidation of the oxidation state of at least one metal in the precursors without full reduction to an elemental state. In one non-limiting embodiment, this reductive atmosphere comprises CO, $CO/CO_2$, $H_2$ or any combinations thereof.

In accordance with a specific non-limiting implementation, the carbon-deposited alkaline metal oxyanion material of the present invention may comprise at its surface and/or in the bulk, additives, such as, without any limitation, carbon particles, carbon fibers and nanofibers, carbon nanotubes, graphene, vapor growth conductive fiber (VGCF), metallic oxides, and any mixtures thereof. Those additives could be in any form including spherical (granular) form, flaky form, a fibrous form and the like. Those additives may be incorporated into the process at any step, for example in a two-step thermal process these additives could be incorporated prior to the first and/or the second thermal step.

By "general formula" one means that the stoichiometry of the material can vary by a few percents from stoichiometry due, for example but without being limited thereto, to substitution or other defects present in the material structure, including anti-sites structural defects such as, without any limitation, cation disorder between iron and lithium in cathode material crystal, see for example Maier et al. [Defect Chemistry of LiFePO$_4$, Journal of the Electrochemical Society, 155, 4, A339-A344, 2008] and Nazar et al. [Proof of Supervalent Doping in Olivine LiFePO$_4$, Chemistry of Materials, 2008, 20 (20), 6313-6315].

The present inventors have discovered that the carbon-deposited alkali metal phosphosilicate cathode material of the present invention can be optimized by optimizing the precursors' ratios. While the inventors noticed that a possible resulting theoretical chemical formula may slightly depart from electroneutrality, without being bond by any theory, it is believed that the carbon-deposited alkali metal phosphosilicate cathode material of the present invention may contain different phases that balance out the material overall charge in order to ultimately obtain overall electroneutrality. Hence, the present invention is not limited to any defined theoretical chemical formula since the person skilled in the art will understand how to optimize the precursors' ratios in order to obtain the desired carbon-deposited alkali metal phosphosilicate cathode material of the present invention without departing from the invention.

In one non-limiting embodiment, the present invention relates to a carbon-deposited alkali metal phosphosilicate cathode material, comprising particles which carry, on at least a portion of their surface, carbon deposited by pyrolysis.

In one non-limiting embodiment, the particles have an olivine structure. However, the scope of the present invention is not limited to an arrangement having an olivine structure. Thus, an arrangement not having an olivine structure is also within the scope of the present invention.

In one non-limiting embodiment, the carbon-deposited alkali metal phosphosilicate cathode material, comprises a metal that has a valence of 2+. For example, the carbon-deposited alkali metal phosphosilicate cathode material comprises Fe(II) and/or Mn(II).

In one non-limiting embodiment, the present invention relates to a carbon-deposited alkali metal phosphosilicate cathode material, comprising particles which carry, on at least a portion of their surface, carbon deposited by pyrolysis, where the particles have a general formula $A_zM_{1-x}M'_xP_{1-y}Si_yO_4$ where the average valency of M is +2 or greater; M is Fe and/or Mn; and A is at least one alkali metal selected from Li, Na and K. Optionally, the Fe and/or Mn is substituted by at most 15% at. of one or more metal at oxidation levels between +1 and +5. M' is a metal of valency of 2+ or more. The x, y and z are defined as follows: $0.8 \leq z \leq 1.2$; $0 < x \leq 0.25$; and y=x*(valency of M'-2)+(1-x)*(average valency of M-2).

In one non-limiting embodiment, z is: $0.9 \leq z \leq 1.1$.

In another non-limiting embodiment, z is: $0.95 \leq z \leq 1.05$.

In yet another non-limiting embodiment, z is: $0.97 \leq z \leq 1.03$.

In yet another non-limiting embodiment, z is: $0.98 \leq z \leq 1.02$.

In a non-limiting embodiment, the present invention relates to a carbon-deposited alkali metal phosphosilicate cathode material, comprising particles which carry, on at least a portion of their surface, carbon deposited by pyrolysis, where the particles have a general formula $AM_{1-x}M'_xP_{1-y}Si_yO_4$ where the average valency of M is +2 or greater; M is Fe and/or Mn; and A is at least one alkali metal selected from Li, Na and K. Optionally, the Fe and/or Mn is substituted by at most 15% at. of one or more metal at oxidation levels between +1 and +5. M' is a metal of valency of 2+ or more. The x, y and z are defined as follows: $0 < x \leq 0.25$; and y=x*(valency of M'-2)+(1-x)*(average valency of M-2).

In a further non-limiting embodiment, the present invention relates to a carbon-deposited alkali metal phosphosilicate cathode material, comprising particles having an olivine structure and which carry, on at least a portion of their surface, carbon deposited by pyrolysis, where the particles have a general formula $LiM_{1-x}M'_xP_{1-y}Si_yO_4$ where the average valency of M is +2 or greater; M is Fe and/or Mn. Optionally, the Fe and/or Mn is substituted by at most 15% at. of one or more metal at oxidation levels between +1 and +5. M' is a metal of valency of 2+ or more. The x, y and z are defined as follows: $0 < x \leq 0.25$; and y=x*(valency of M'-2)+(1-x)*(average valency of M-2).

In the present invention, the phosphate polyanion (PO$_4$) and/or SiO$_4$ can also be partly substituted by another XO$_4$ oxyanion, in which X is either P, S, V, Si, Nb, Mo or any combinations thereof.

In one non-limiting embodiment, the present invention relates to a carbon-deposited alkali metal phosphosilicate cathode material, comprising particles which carry, on at least a portion of their surface, carbon deposited by pyrolysis, where the particles have a general element ratios Li:(Fe+Zr):PO$_4$:SiO$_4$ of about 1:1:0.7-1:>0-0.3 ratios.

In another non-limiting embodiment, the present invention relates to an optimized carbon-deposited alkali metal phosphosilicate cathode material, comprising particles which carry, on at least a portion of their surface, carbon deposited by pyrolysis, where the particles have a general element ratios Li:Fe:Zr:PO$_4$:SiO$_4$, at about $1+/-x:0.95+/-x:0.05+/-x:0.95+/-x:0.05+/-x$ ratios, where x is independently about 20% of value.

In another non-limiting embodiment, the present invention relates to an optimized carbon-deposited alkali metal phosphosilicate cathode material, comprising particles which carry, on at least a portion of their surface, carbon deposited by pyrolysis, where the particles have a general element ratios Li:Fe:Zr:PO$_4$:SiO$_4$, at about $1+/-x:0.95+/-x:0.05+/-x:0.95+/-x:0.05+/-x$ ratios, where x is independently about 10% of value.

In one non-limiting embodiment, x is about 5% of value.

In another non-limiting embodiment, x is about 4% of value.

In yet another non-limiting embodiment, x is about 3% of value.

In yet another non-limiting embodiment, x is about 2% of value.

In yet another non-limiting embodiment, the present invention relates to a carbon-deposited alkali metal phosphosilicate cathode material, comprising particles which carry, on at least a portion of their surface, carbon deposited by pyrolysis, where the particles have the general formula $LiM_{1-x}M'_x(PO_4)_{1-2x}(SiO_4)_{2x}$ where M is Fe and/or Mn, and M' is 4+ metal. Optionally, the phosphate polyanion (PO$_4$) can also be partly substituted by sulfate polyanion (SO$_4$) and/or the lithium metal can be partly substituted by Na and/or K.

In yet another non-limiting embodiment, the present invention relates to a carbon-deposited alkali metal phosphosilicate cathode material, comprising particles which carry, on at least a portion of their surface, carbon deposited by pyrolysis, where the particles have the general formula $LiFe_{1-x}M'_x(PO_4)_{1-2x}(SiO_4)_{2x}$, where M' is a 4+ metal. Optionally, the phosphate polyanion (PO$_4$) can also be partly substituted by sulfate polyanion (SO$_4$) and/or the lithium metal can be partly substituted by Na and/or K.

In yet another non-limiting embodiment, the present invention relates to a carbon-deposited alkali metal phosphosilicate cathode material, comprising particles which carry, on at least a portion of their surface, carbon deposited by pyrolysis, where the particles have the general formula $AM_{1-x}M'_x(XO_4)_{1-2x}(SiO_4)_{2x}$, where:

A is Li, alone or partially replaced by at most 30% as atoms of Na and/or K;

M is a metal comprising at least 90% at. of Fe(II) or Mn(II) or a mixture thereof, and at most 10% at. of one or more metal at oxidation levels between +1 and +5;

M' is a 4+ valency metal comprising at least one of $Zr^{4+}$, $Ti^+$, $Nb^{4+}$, $Mo^{4+}$, $Ge^{4+}$, $Ce^{4+}$ or $Sn^{4+}$;

$XO_4$ is $PO_4$, alone or partially replaced by at most 30 mol % of $SO_4$; and $0.03 \le x \le 0.15$.

In yet another non-limiting embodiment, the present invention relates to a carbon-deposited alkali metal phosphosilicate cathode material, comprising particles which carry, on at least a portion of their surface, carbon deposited by pyrolysis, where the particles have the general formula $AM_{1-x}M'_x(XO_4)_{1-2x}(SiO_4)_{2x}$, where:

A is Li, alone or partially replaced by at most 10% as atoms of Na or K;

M is a metal comprising at least 90% at. of Fe(II) or Mn(II) or a mixture thereof, and at most:
  I. 10% as atoms of Ni and/or Co;
  II. 10% as atoms of one or more aliovalent or isovalent metals other than Ni or Co;
  III. 10% as atoms of Fe(III); or
  IV. any combinations of I. to III.;

M' is a 4+ valency metal comprising at least one of $Zr^{4+}$, $Ti^+$, $Nb^{4+}$, $Mo^{4+}$, $Ge^{4+}$, $Ce^{4+}$ or $Sn^{4+}$;

$XO_4$ is $PO_4$, alone or partially replaced by at most 10 mol % of $SO_4$; and
$0.03 \le x \le 0.15$.

In yet another non-limiting embodiment, the present invention relates to a carbon-deposited alkali metal phosphosilicate cathode material, comprising particles which carry, on at least a portion of their surface, carbon deposited by pyrolysis, where the particles have the general formula $AM_{1-x}M'_x(XO_4)_{1-2x}(Si_4)_{2x}$, where:

A is Li;
M is Fe(II);
M' is a 4+ valency metal comprising at least one of $Zr^{4+}$, $Ti^+$, $Nb^{4+}$, $Mo^{4+}$, $Ge^{4+}$, $Ce^{4+}$ or $Sn^{4+}$;
$XO_4$ is $PO_4$; and
$0.03 \le x \le 0.15$.

In yet another non-limiting embodiment, the present invention relates to a carbon-deposited alkali metal phosphosilicate cathode material, comprising particles which carry, on at least a portion of their surface, carbon deposited by pyrolysis, where the particles have the general formula $AM_{1-x}M'_x(XO_4)_{1-2x}(SiO_4)_{2x}$, where:

A is Li;
M is Fe(II);
M' is $Zr^{4+}$;
$XO_4$ is $PO_4$; and
$0.03 \le x \le 0.15$.

In yet another non-limiting embodiment, the present invention relates to a carbon-deposited alkali metal phosphosilicate cathode material, comprising particles which carry, on at least a portion of their surface, carbon deposited by pyrolysis, where the particles have the general formula $LiFe_{1-x}Zr_x(PO_4)_{1-2x}(SiO_4)_{2x}$ where $0.03 \le x \le 0.1$, or $0.03 \le x \le 0.08$, or $0.04 \le x \le 0.06$.

In yet another non-limiting embodiment, the present invention relates to a carbon-deposited alkali metal phosphosilicate cathode material, comprising particles which carry, on at least a portion of their surface, carbon deposited by pyrolysis, where the particles have the general formula $LiFe_{0.9}Zr_{0.1}(PO_4)_{0.8}(SiO_4)_{0.2}$.

In yet another non-limiting embodiment, the present invention relates to a carbon-deposited alkali metal phosphosilicate cathode material, comprising particles which carry, on at least a portion of their surface, carbon deposited by pyrolysis, where the particles have the general formula $LiM_{1-x}M'_x(PO_4)_{1-x}(SiO_4)_x$ where M is Fe and/or Mn, and M' is 3+ metal. Optionally, the phosphate polyanion ($PO_4$) can also be partly substituted by sulfate polyanion ($SO_4$) and/or the lithium metal can be partly substituted by Na and/or K.

In yet another non-limiting embodiment, the present invention relates to a carbon-deposited alkali metal phosphosilicate cathode material, comprising particles which carry, on at least a portion of their surface, carbon deposited by pyrolysis, where the particles have the general formula $LiFe_{1-x}M'_x(PO_4)_{1-x}(SiO_4)_x$, where M' is a 3+ metal. Optionally, the phosphate polyanion ($PO_4$) can also be partly substituted by sulfate polyanion ($SO_4$) and/or the lithium metal can be partly substituted by Na and/or K.

In yet another non-limiting embodiment, the present invention relates to a carbon-deposited alkali metal phosphosilicate cathode material, comprising particles which carry, on at least a portion of their surface, carbon deposited by pyrolysis, where the particles have the general formula $AM_{1-x}M'_x(XO_4)_{1-x}(SiO_4)_x$, where:

A is Li, alone or partially replaced by at most 30% as atoms of Na and/or K;

M is a metal comprising at least 90% at. of Fe(II) or Mn(II) or a mixture thereof, and at most 10% at. of one or more metal at oxidation levels between +1 and +5;

M' is a 3+ valency metal comprising at least one of $Al^{3+}$, $Y^{3+}$, $Nb^{3+}$, $Ti^{3+}$, $Ga^{3+}$, $Cr^{3+}$ or $V^{3+}$;

$XO_4$ is $PO_4$, alone or partially replaced by at most 30 mol % of $SO_4$; and
$0.03 \le x \le 0.15$.

In yet another non-limiting embodiment, the present invention relates to a carbon-deposited alkali metal phosphosilicate cathode material, comprising particles which carry, on at least a portion of their surface, carbon deposited by pyrolysis, where the particles have the general formula $AM_{1-x}M'_x(XO_4)_{1-x}(SiO_4)_x$, where:

A is Li, alone or partially replaced by at most 10% as atoms of Na or K;

M is a metal comprising at least 90% at. of Fe(II) or Mn(II) or a mixture thereof, and at most:
  I. 10% as atoms of Ni and/or Co;
  II. 10% as atoms of one or more aliovalent or isovalent metals other than Ni or Co;
  III. 10% as atoms of Fe(III); or
  IV. any combinations of I. to III.;

M' is a 3+ valency metal comprising at least one of $Al^{3+}$, $Y^{3+}$, $Nb^{3+}$, $Ti^{3+}$, $Ga^{3+}$, $Cr^{3+}$ or $V^{3+}$;

$XO_4$ is $PO_4$, alone or partially replaced by at most 10 mol % of $SO_4$; and
$0.03 \le x \le 0.15$.

In yet another non-limiting embodiment, the present invention relates to a carbon-deposited alkali metal phosphosilicate cathode material, comprising particles which carry, on at least a portion of their surface, carbon deposited by pyrolysis, where the particles have the general formula $AM_{1-x}M'_x(XO_4)_{1-x}(SiO_4)_x$, where:

A is Li;
M is Fe(II);
M' is a 3+ valency metal comprising at least one of $Al^{3+}$, $Y^{3+}$, $Nb^{3+}$, $Ti^{3+}$, $Ga^{3+}$, $Cr^{3+}$ or $V^{3+}$;

XO$_4$ is PO$_4$; and
0.03≤x≤0.15.

In yet another non-limiting embodiment, the present invention relates to a carbon-deposited alkali metal phosphosilicate cathode material, comprising particles which carry, on at least a portion of their surface, carbon deposited by pyrolysis, where the particles have the general formula AM$_{1-x}$M'$_x$(XO$_4$)$_{1-x}$(SiO$_4$)$_x$, where:

A is Li;
M is Fe(II);
M' is Y$^{3+}$ or Al$^{3+}$;
XO$_4$ is PO$_4$; and
0.03≤x≤0.15.

In yet another non-limiting embodiment, the present invention relates to a carbon-deposited alkali metal phosphosilicate cathode material, comprising particles which carry, on at least a portion of their surface, carbon deposited by pyrolysis, where the particles have the general formula LiFe$_{1-x}$M"$_x$(PO$_4$)$_{1-x}$(SiO$_4$)$_x$, where M" is Y$^{3+}$ and/or Al$^{3+}$, and 0.03≤x≤0.1, or 0.03≤x≤0.08, or 0.04≤x≤0.06.

In yet another non-limiting embodiment, the present invention relates to a carbon-deposited alkali metal phosphosilicate cathode material, comprising particles which carry, on at least a portion of their surface, carbon deposited by pyrolysis, where the particles have the general formula LiFe$_{0.9}$M"$_{0.1}$(PO$_4$)$_{0.9}$(SiO$_4$)$_{0.1}$, where M" is Y$^{3+}$ and/or Al$^{3+}$.

In yet another non-limiting embodiment, the present invention relates to a carbon-deposited alkali metal phosphosilicate cathode material, comprising particles which carry, on at least a portion of their surface, carbon deposited by pyrolysis, where the particles have the general formula LiFe$_{0.95}$M"$_{0.05}$(PO$_4$)$_{0.95}$(SiO$_4$)$_{0.05}$, where M" is Y$^{3+}$ and/or Al$^{3+}$.

Example 1

1-Step Solid-State Reaction

FePO$_4$.2H$_2$O (0.4 mole) serving as a phosphorus (P) and iron source, iron oxalate dihydrate (0.05 mole) serving as an iron source, Li$_2$CO$_3$ (0.25 mole) serving as a lithium source, tetraethyl orthosilicate Si(OC$_2$H$_5$)$_4$ (0.1 mole) serving as a silicon (Si) source, Zr(IV) acetate hydroxide (0.05 mole) serving as a Zr$^{4+}$ source, at an atomic ratio of Li:Fe:Zr:P:Si=1:0.9:0.1:0.8:0.2, and polymeric Unithox™ 550 (5 wt. % of precursors, manufactured by Baker Hughes) as a carbon source were mixed together in a mortar. The resulting mixture was heated at about 550° C. for about 6 hours under nitrogen atmosphere. The X-ray spectrum, represented in FIG. 1, of the resulting product showed formation of Li$_3$PO$_4$, ZrO$_2$ and LiZr$_2$(PO$_4$)$_3$ impurity phases. The unit cell volume of the resulting olivine was 291 Å$^3$.

Example 2

1-Step High-Energy Milling and 1-Step Solid-State Reaction

Figure 2:
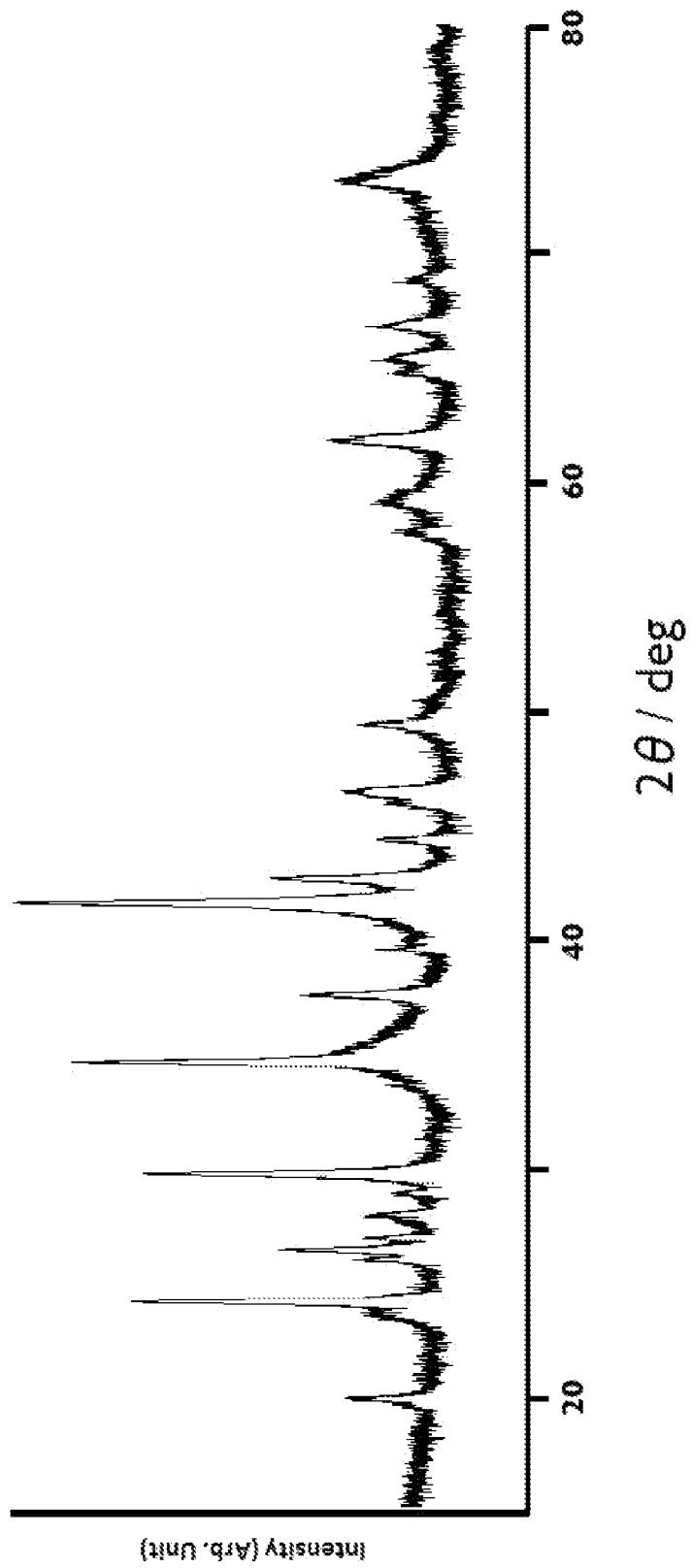
FIG. 2 represents the XRD spectrum (CoKα) of carbon-deposited lithium iron zirconium phosphosilicate, obtained from $FePO_4$, iron oxalate, $Li_2CO_3$, $Si(OC_2H_5)_4$, Zr(IV) acetate hydroxide, at an atomic ratio Li:Fe:Zr:P:Si=1:0.9:0.1:0.8:0.2, as prepared in example 2. Unit cell volume calculated from XRD data is 291.1 Å$^3$ comparatively to 291 Å$^3$ for C—LiFePO$_4$.

FePO$_4$.2H$_2$O (0.4 mole) serving as a phosphorus (P) and iron source, iron oxalate dihydrate (0.05 mole) serving as an iron source, Li$_2$CO$_3$ (0.25 mole) serving as a lithium source, tetraethyl orthosilicate Si(OC$_2$H$_5$)$_4$ (0.1 mole) serving as a silicon (Si) source, Zr(IV) acetate hydroxide (0.05 mole) serving as a Zr$^{4+}$ source, at an atomic ratio of Li:Fe:Zr:P:Si=1:0.9:0.1:0.8:0.2, and polymeric Unithox™ 550 (5 wt. % of precursors, manufactured by Baker Hughes) as a carbon source were high-energy milled in a SPEX Mill for about 2 hours. The resulting high-energy milled mixture was then heated at about 550° C. for about 6 hours under nitrogen atmosphere. The X-ray spectrum, represented in FIG. 2, of the resulting product showed formation of Li$_3$PO$_4$, ZrO$_2$ and LiZr$_2$(PO$_4$)$_3$ impurity phases. The unit cell volume of the resulting olivine was 291.1 Å$^3$. The experiment has been repeated with similar results by replacing the SPEX Mill with an Attritor® with a bead/precursor ratio of 20:1.

Example 3

2-Step High-Energy Milling and 2-Step Solid-State Reaction, High Temperature

Figure 3:
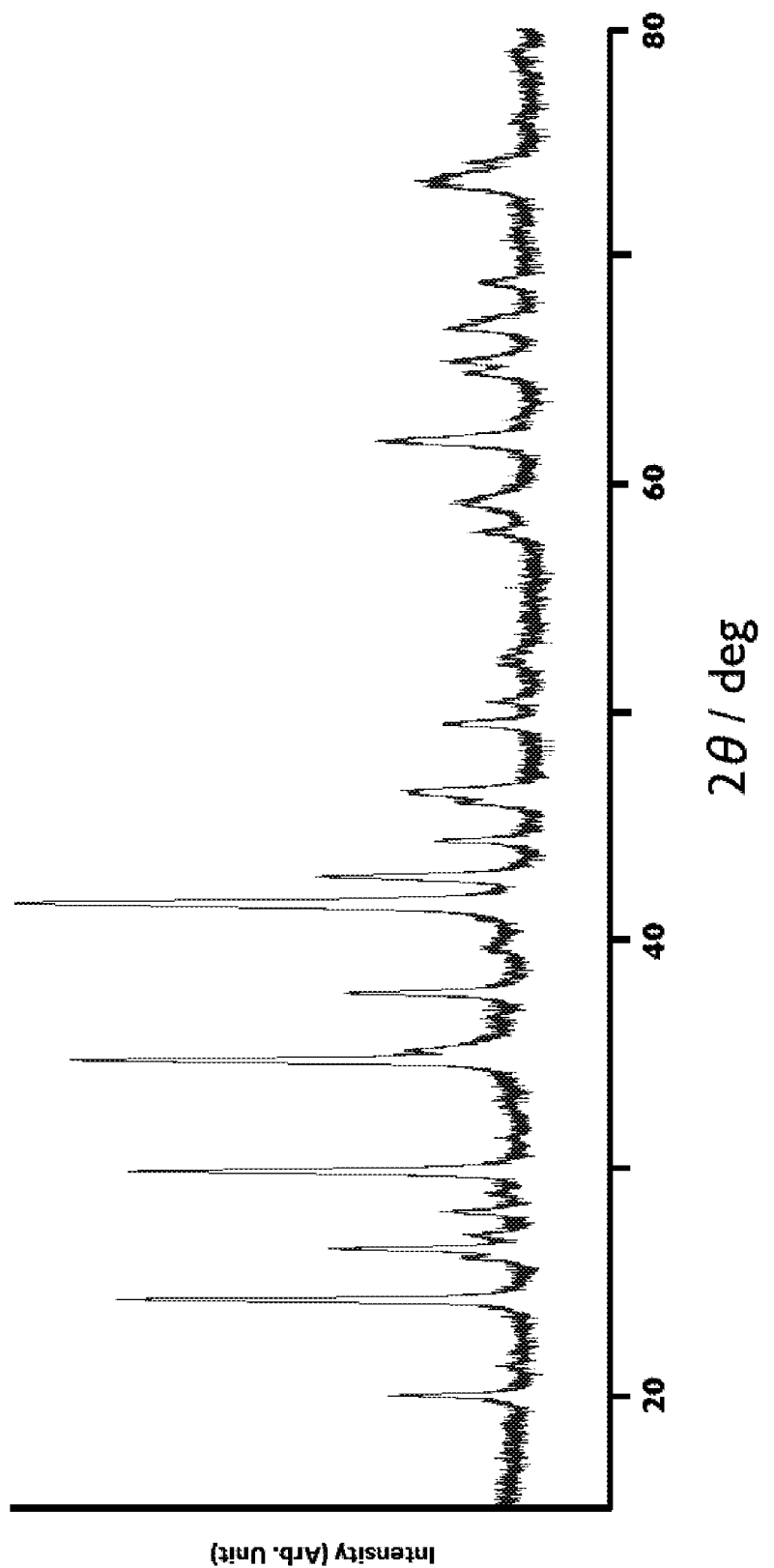
FIG. 3 represents the XRD spectrum (CoKα) of carbon-deposited lithium iron zirconium phosphosilicate, obtained from $FePO_4$, iron oxalate, $Li_2CO_3$, $Si(OC_2H_5)_4$, Zr(IV) acetate hydroxide, at an atomic ratio Li:Fe:Zr:P:Si=1:0.9:0.1:0.8:0.2, as prepared in example 3. Unit cell volume calculated from XRD data is 291.8 Å$^3$ comparatively to 291 Å$^3$ for C—LiFePO$_4$.

FePO$_4$.2H$_2$O (0.4 mole) serving as a phosphorus (P) and iron source, iron oxalate dihydrate (0.05 mole) serving as an iron source, Li$_2$CO$_3$ (0.25 mole) serving as a lithium source, tetraethyl orthosilicate Si(OC$_2$H$_5$)$_4$ (0.1 mole) serving as a silicon (Si) source, Zr(IV) acetate hydroxide (0.05 mole) serving as a Zr$^{4+}$ source, at an atomic ratio of Li:Fe:Zr:P:Si=1:0.9:0.1:0.8:0.2, and polymeric Unithox™ 550 (5 wt. % of precursors, manufactured by Baker Hughes) as a carbon source were high-energy milled in a SPEX Mill for 2 hours. The resulting high-energy milled mixture was then heated at about 550° C. for 6 hours under nitrogen atmosphere. The process was then repeated a second time using the same high-energy milling and heating conditions. In other words, a second high-energy milling step and a second heating step were performed after the above first heating step. The X-ray spectrum, represented in FIG. 3, of the resulting product showed formation of Li$_3$PO$_4$ and ZrO$_2$ impurity phases. The unit cell volume of the resulting olivine is 291.8 Å$^3$. The experiment has been repeated with similar results by replacing the SPEX Mill with an Attritor® with a bead/precursor ratio of 20:1.

Example 4

2-Step High-Energy Milling and 2-Step Solid-State Reaction, Low Temperature

Figure 4:
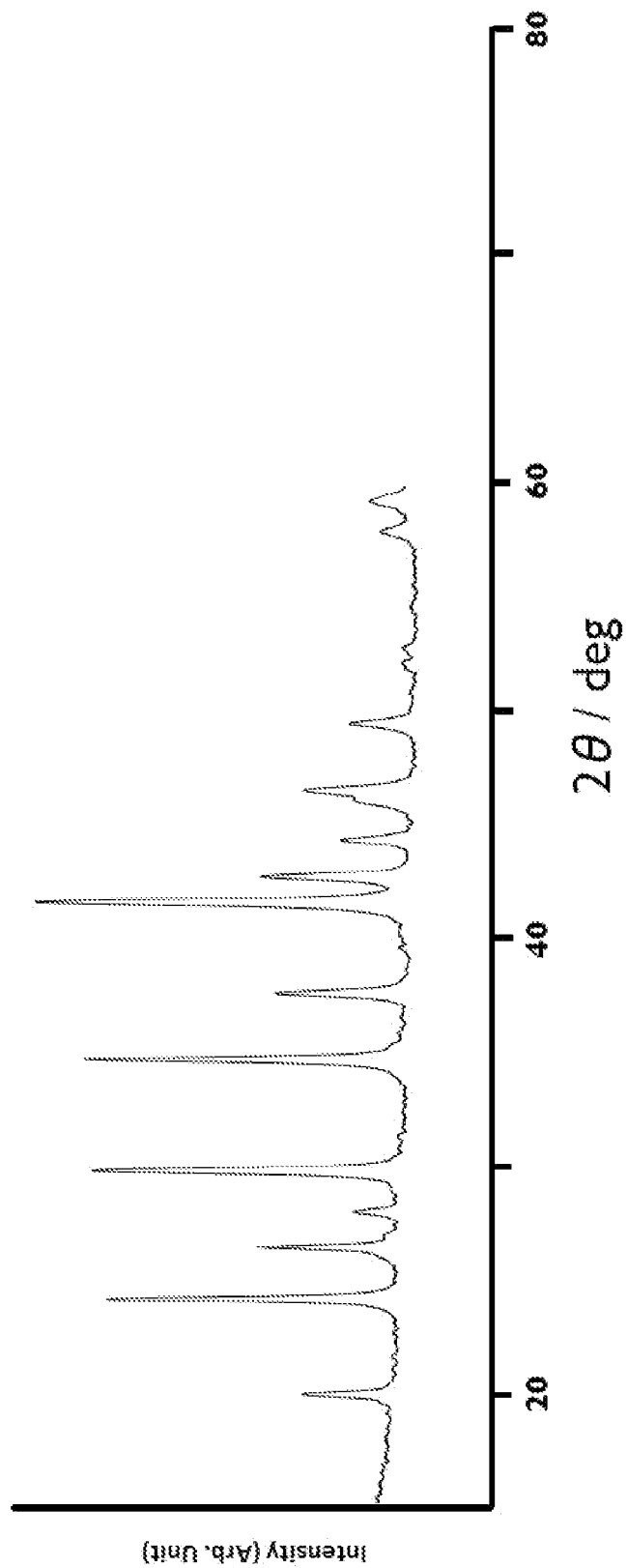
FIG. 4 represents the XRD spectrum (CoKα) of carbon-deposited lithium iron zirconium phosphosilicate, obtained from $FePO_4$, iron oxalate, $Li_2CO_3$, $Si(OC_2H_5)_4$, Zr(IV) acetate hydroxide, at an atomic ratio Li:Fe:Zr:P:Si=1:0.9:0.1:0.8:0.2, as prepared in example 4. Unit cell volume calculated from XRD data is 292.6 Å$^3$ comparatively to 291 Å$^3$ for C—LiFePO$_4$.

FePO$_4$.2H$_2$O (0.4 mole) as a phosphorus (P) and iron source, iron oxalate dihydrate (0.05 mole) as an iron source, Li$_2$CO$_3$ (0.25 mole) as a lithium source, tetraethyl orthosilicate Si(OC$_2$H$_5$)$_4$ (0.1 mole) as a silicon (Si) source, Zr(IV) acetate hydroxide (0.05 mole) as a Zr$^{4+}$ source, at an atomic ratio of Li:Fe:Zr:P:Si=1:0.9:0.1:0.8:0.2, and polymeric Unithox™ 550 (5 wt. % of precursors, manufactured by Baker Hughes) as a carbon source were high-energy milled in a SPEX Mill for about 1 hour. The resulting high-energy milled mixture was then heated at about 300° C. for about 1 hour under nitrogen atmosphere. Gaseous products evolved during this thermal step. The resulting product was then high-energy milled for about one hour with a SPEX Mill to produce an amorphous precursor. The resulting high-energy milled amorphous precursor was then heated at about 550° C. for about 5 hours under nitrogen atmosphere. The X-ray spectrum of the resulting carbon-deposited lithium iron zirconium phosphosilicate product, provided in FIG. 4, shows a unit cell volume of 292.6 Å$^3$ and no clear formation of impurity phase. The experiment has been repeated with similar results by replacing the SPEX Mill with an Attritor® with a bead/precursor ratio of 20:1.

The experiment has been repeated with similar results by replacing Zr(IV) acetate hydroxide with tetra n-butyl zirconate solution in butanol (Tyzor® NBZ with approximately 87% active content in n-butanol, manufactured by Dorf Ketal) using a SPEX Mill and using the precursors at same atomic ratio of Li:Fe:Zr:P:Si=1:0.9:0.1:0.8:0.2.

The experiment has also been repeated with similar results by replacing Zr(IV) acetate hydroxide with bis[tri-n-butyltin (IV)]oxide (0.025 mole) as a $Sn^{4+}$ source, using a SPEX Mill and using the precursors at an atomic ratio of Li:Fe:Sn:P:Si=1:0.9:0.1:0.8:0.2. This experiment produced a carbon-deposited lithium iron tin phosphosilicate. The experiment has also been repeated with similar results by replacing Zr(IV) acetate hydroxide with titanium(IV) 2-ethylhexyloxide (0.025 mole) as a $Ti^{4+}$ source, using a SPEX Mill and using the precursors at an atomic ratio of Li:Fe:Ti:P:Si=1:0.9:0.1:0.8:0.2. This experiment produced a carbon-deposited lithium iron titanium phosphosilicate.

Results obtained from the above illustrative examples with $Zr^{4+}$ are summarized in the following Table 1.

TABLE 1

| Name | $1^{st}$ milling | $1^{st}$ annealing | $2^{nd}$ milling | $2^{nd}$ annealing | cell volume ($Å^3$) | % change |
|---|---|---|---|---|---|---|
| Commercial C-LiFePO$_4$ | | | | | 291 | Reference |
| 1-step solid-state | none | 550° C., 6 h | none | none | 291 | 0% |
| 1-step milling | 2 hours | 550° C., 6 h | none | none | 291.1 | 8.8% |
| 2-step milling-high T | 2 hours | 550° C., 6 h | 2 hours | 550° C., 6 h | 291.8 | 44.7% |
| 2-step milling-low T | 2 hours | 300° C., 6 h | 2 hours | 550° C., 6 h | 292.6 | 91.2% |

The results in Table 1 suggest that a reaction which includes a single high-energy milling step of precursors prior to a thermal step provides an about 8.8% change in terms of unit cell volume relatively to the unit cell volume of commercial C—LiFePO$_4$. The results also suggest that a reaction which includes two solid-state thermal steps and two high-energy milling steps prior to each of the thermal steps provides at least an about 44.7% change in terms of unit cell volume relatively to the unit cell volume of commercial C—LiFePO$_4$.

The results also suggest that a reaction which includes two solid-state thermal steps where the first thermal step is performed at a relatively low temperature, i.e. about 300° C., in contrast to a relatively higher temperature, i.e. about 550° C., provides a higher % change in terms of unit cell volume relatively to the unit cell volume of commercial C—LiFePO$_4$, e.g. 91.2% vs. 44.7%, respectively. Moreover, the inventors have observed that a relatively high temperature during the second thermal step could lead to a decomposition of the end-compound resulting impurities phases, e.g. in the case of the illustrative end-compound of the examples the impurities phases include $ZrO_2$ and $LiZr_2(PO_4)_3$.

Example 5

2-Step High-Energy Milling and 2-Step Solid-State Reaction, Low Temperature

Figure 5:
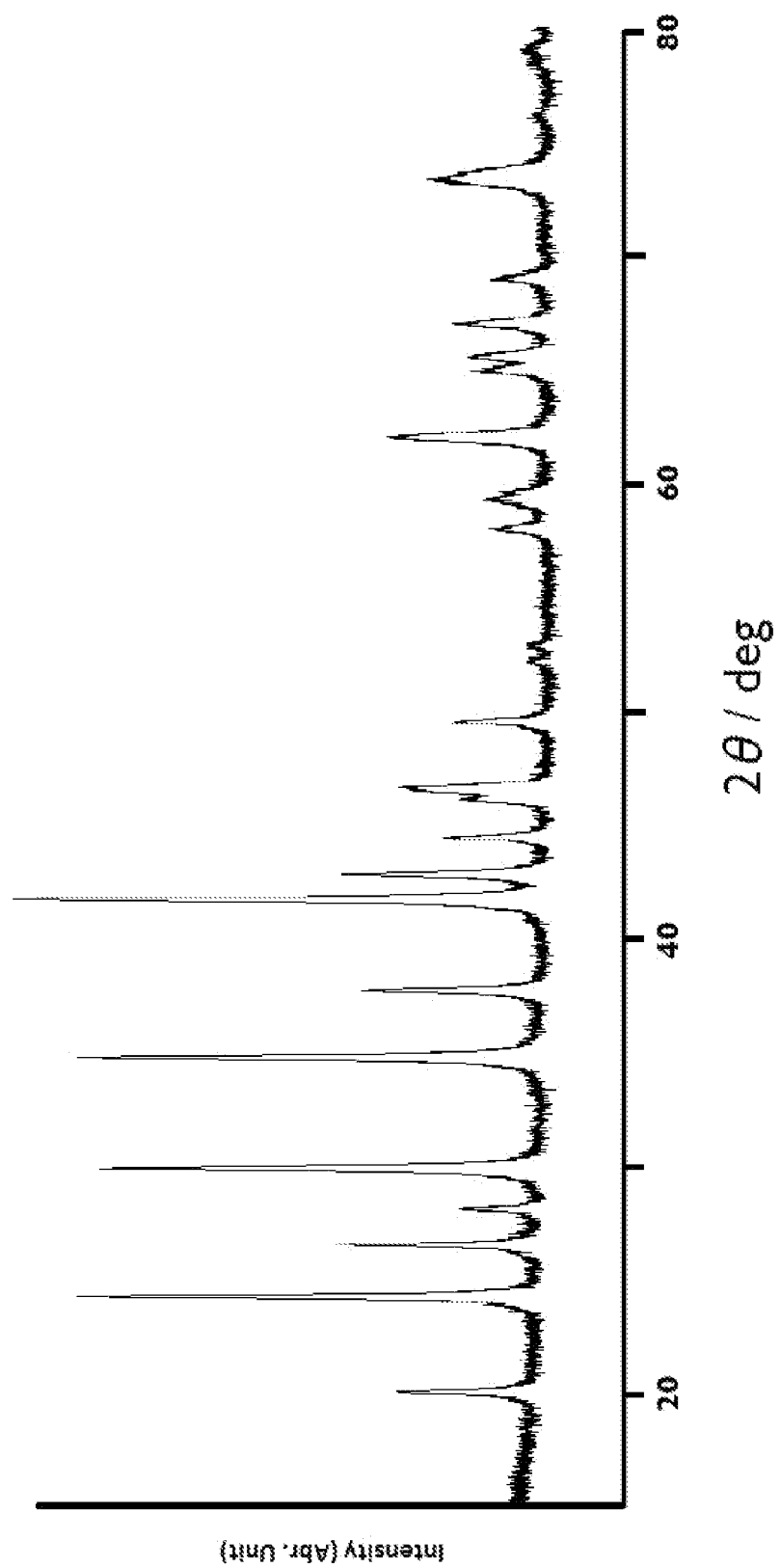
FIG. 5 represents the XRD spectrum (CoKα) of carbon-deposited lithium iron zirconium phosphosilicate, obtained from iron oxalate, $LiH_2PO_4$, $Li_2CO_3$, $Si(OC_2H_5)_4$, Zr(IV) acetate hydroxide, at an atomic ratio Li:Fe:Zr:P:Si=1:0.95: 0.05:0.95:0.05, as prepared in example 5. Unit cell volume calculated from XRD data is 291.3 $Å^3$ comparatively to 291 $Å^3$ for C—$LiFePO_4$.

Iron oxalate dihydrate (590.11 g) serving as an iron source, $Li_2CO_3$ (6.38 g) serving as a lithium source, $LiH_2PO_4$ (340.92 g) serving as a phosphorus (P) and lithium source, tetraethyl orthosilicate $Si(OC_2H_5)_4$ (35.96 g) serving as a silicon (Si) source, Zr(IV) acetate hydroxide (36.63 g) serving as a $Zr^{4+}$ source, at an atomic ratio of Li:Fe:Zr:P:Si=1:0.95:0.05:0.95:0.05, stearic acid (13.7 g) and grade M 5005 micronized polyethylene wax powders (13.7 g, manufactured by Marcus Oil & Chemical), both as a carbon source, were charged in a high-energy ball milling vertical agitation Attritor® (Union Process 1-S) containing 10 kg of yttrium-stabilized $ZrO_2$ beads (10 mm diameter) as milling media. The Attritor® was then operated during 2 hours at a speed of 350 rpm. The resulting high-energy milled mixture was then heated at about 300° C. for about 1 hour under nitrogen atmosphere. Gaseous products evolved during this thermal step. The resulting product was then high-energy milled for about two hours in Attritor® to produce an amorphous precursor. The resulting high-energy milled amorphous precursor was then heated at about 570° C. for about 6 hours under humid nitrogen gas (bubbled in water at around 80° C.), dry nitrogen gas is used during heating step (around 90 mn) and cooling step (around 180 mn). The X-ray spectrum of the resulting carbon-deposited lithium iron zirconium phosphosilicate, provided in FIG. 5, shows a unit cell volume of 291.3 $Å^3$ and no clear formation of impurity phase.

Figure 6:
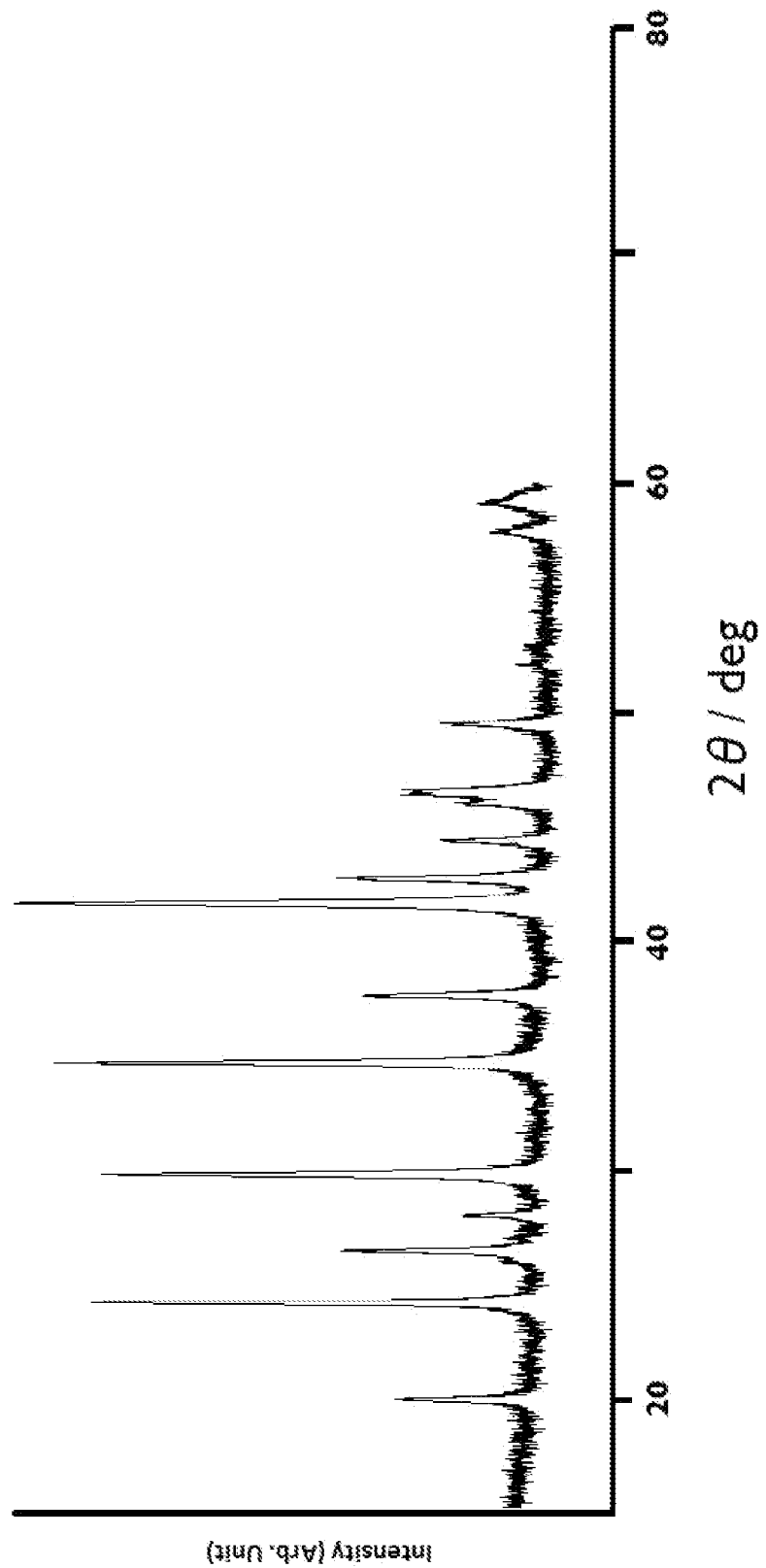
FIG. 6 represents the XRD spectrum (CoKα) of carbon-deposited lithium iron zirconium phosphosilicate, obtained from iron oxalate, $LiH_2PO_4$, $Li_2CO_3$, $Si(OC_2H_5)_4$, Zr(IV) acetate hydroxide, at an atomic ratio Li:Fe:Zr:P:Si=1:0.95: 0.05:0.9:0.1, as prepared in example 5. Unit cell volume calculated from XRD data is 291.6 $Å^3$ comparatively to 291 $Å^3$ for C—$LiFePO_4$.
Figure 7:
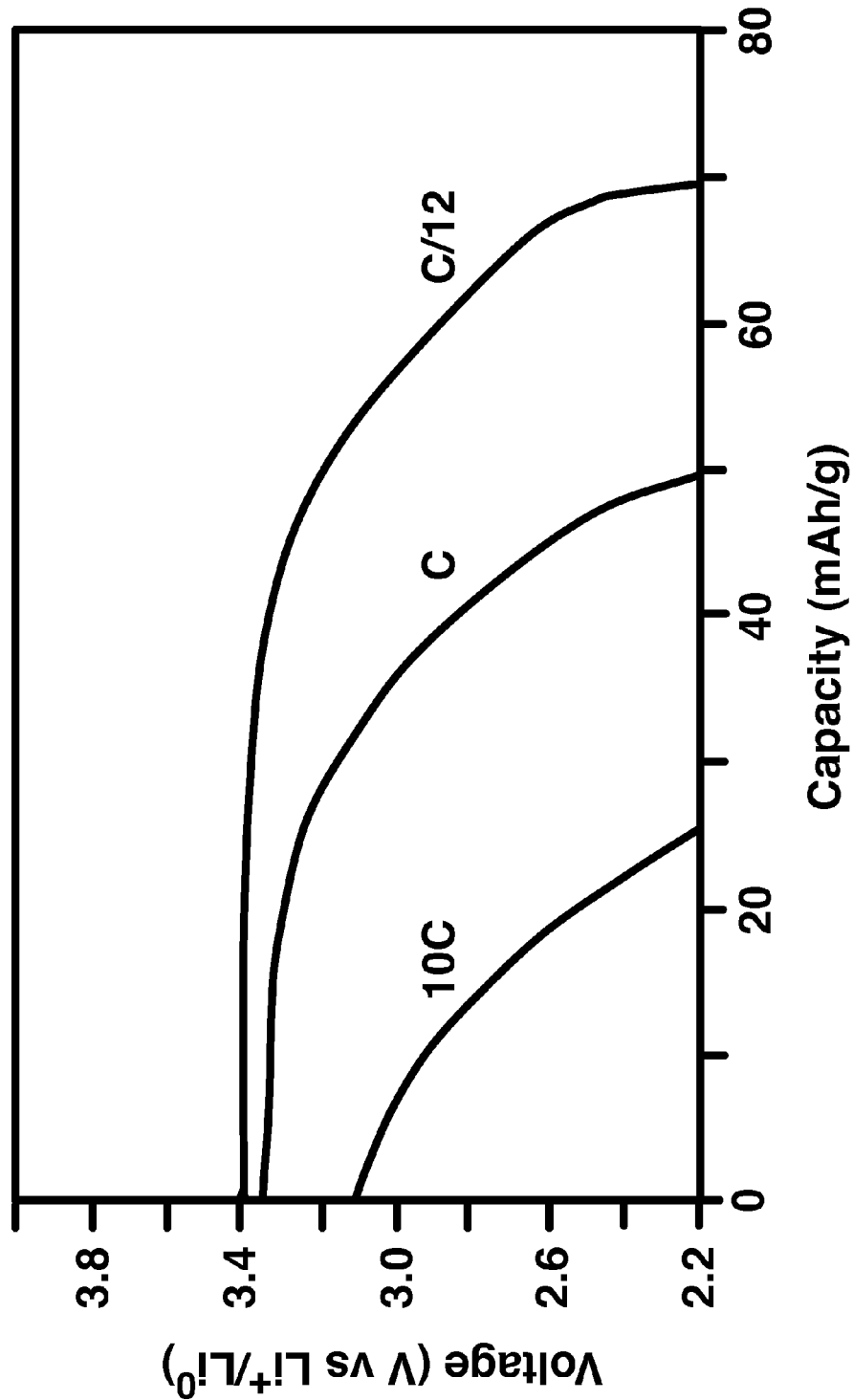
FIG. 7 represents cathode capacity, determined at room temperature and C/12, C and 10 C discharge rate, for a Li/1M $LiPF_6$ EC:DEC 3:7/carbon-deposited lithium iron zirconium phosphosilicate battery. Battery voltage (in Volt vs $Li^+$/Li) is indicated on Y axis and capacity (in mAh/g) is indicated on X axis. Battery has been prepared with a positive electrode containing a cathode material embodiment of the present invention prepared in example 2.
Figure 8:
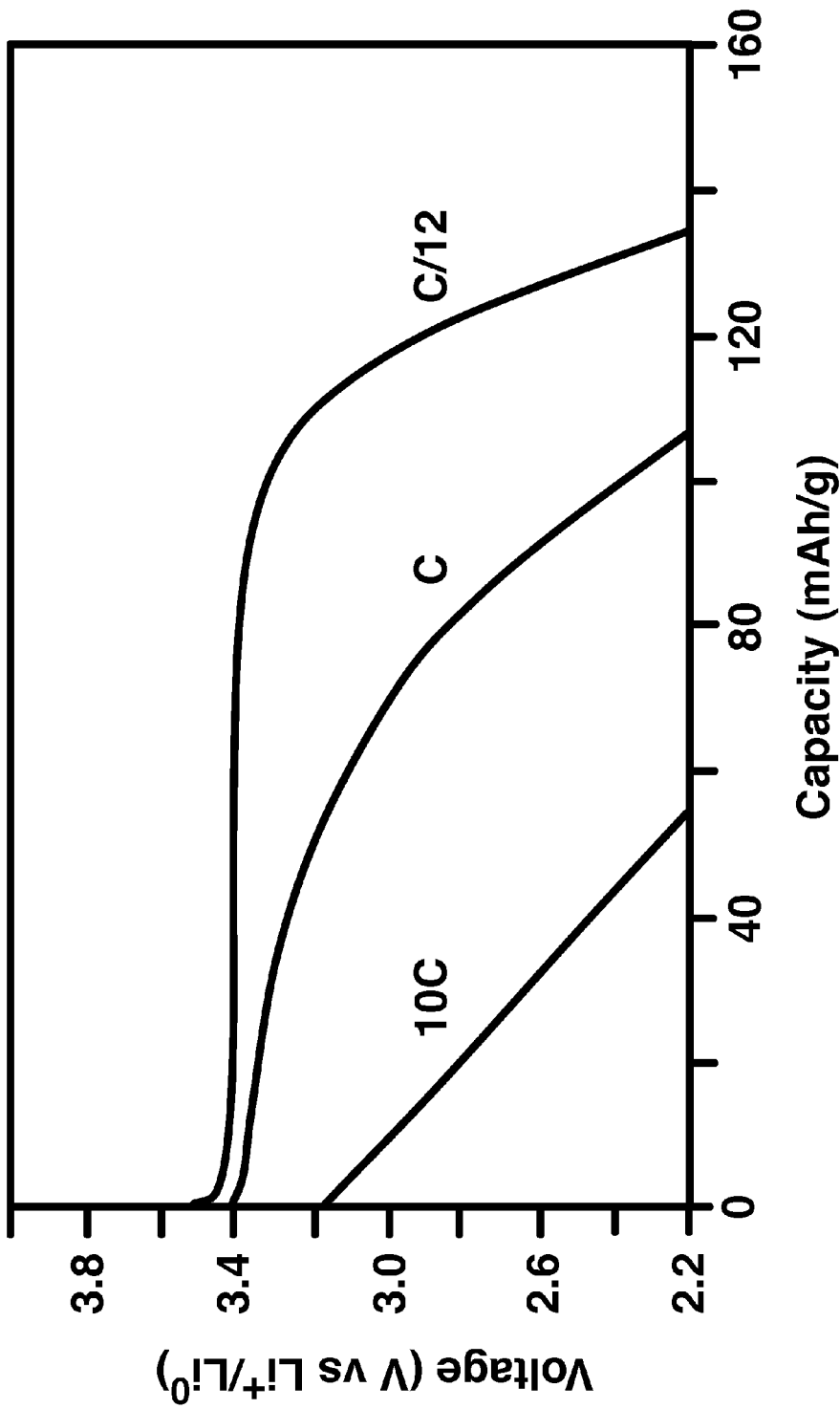
FIG. 8 represents cathode capacity, determined at room temperature and C/12, C and 10 C discharge rate, for a Li/1M $LiPF_6$ EC:DEC 3:7/carbon-deposited lithium iron zirconium phosphosilicate battery. Battery voltage (in Volt vs $Li^+$/Li) is indicated on Y axis and capacity (in mAh/g) is indicated on X axis. Battery has been prepared with a positive electrode containing a carbon-deposited lithium iron zirconium phosphosilicate embodiment of the present invention, at an atomic ratio Li:Fe:Zr:P:Si=1:0.95:0.05:0.9:0.1, prepared in example 5.
Figure 9:
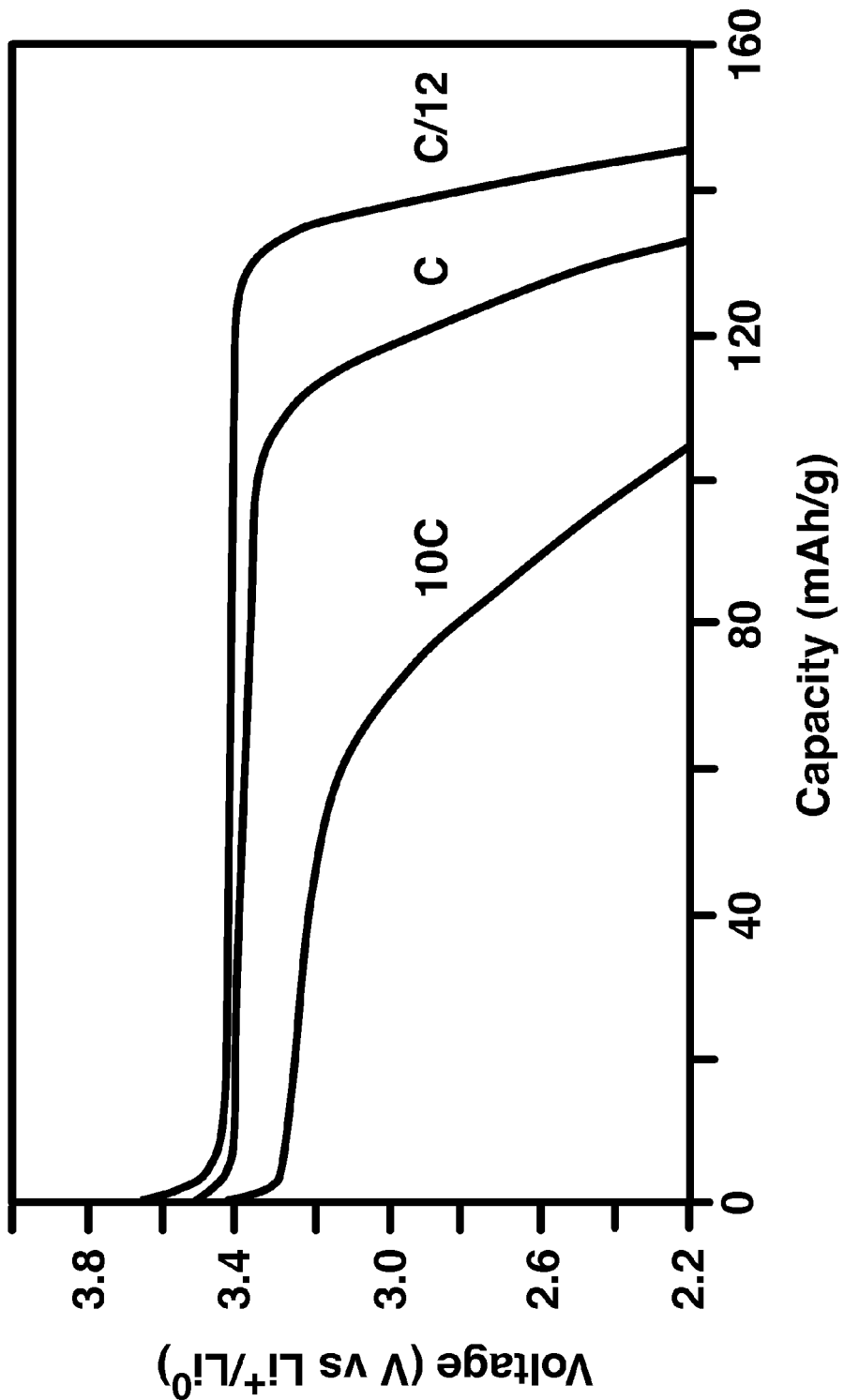
FIG. 9 represents cathode capacity, determined at room temperature and C/12, C and 10 C discharge rate, for a Li/1M $LiPF_6$ EC:DEC 3:7/carbon-deposited lithium iron zirconium phosphosilicate battery. Battery voltage (in Volt vs $Li^+$/Li) is indicated on Y axis and capacity (in mAh/g) is indicated on X axis. Battery has been prepared with a positive electrode containing a carbon-deposited lithium iron zirconium phosphosilicate embodiment of the present invention, at an atomic ratio Li:Fe:Zr:P:Si=1:0.95:0.05:0.95:0.05, prepared in example 5.
Figure 10:
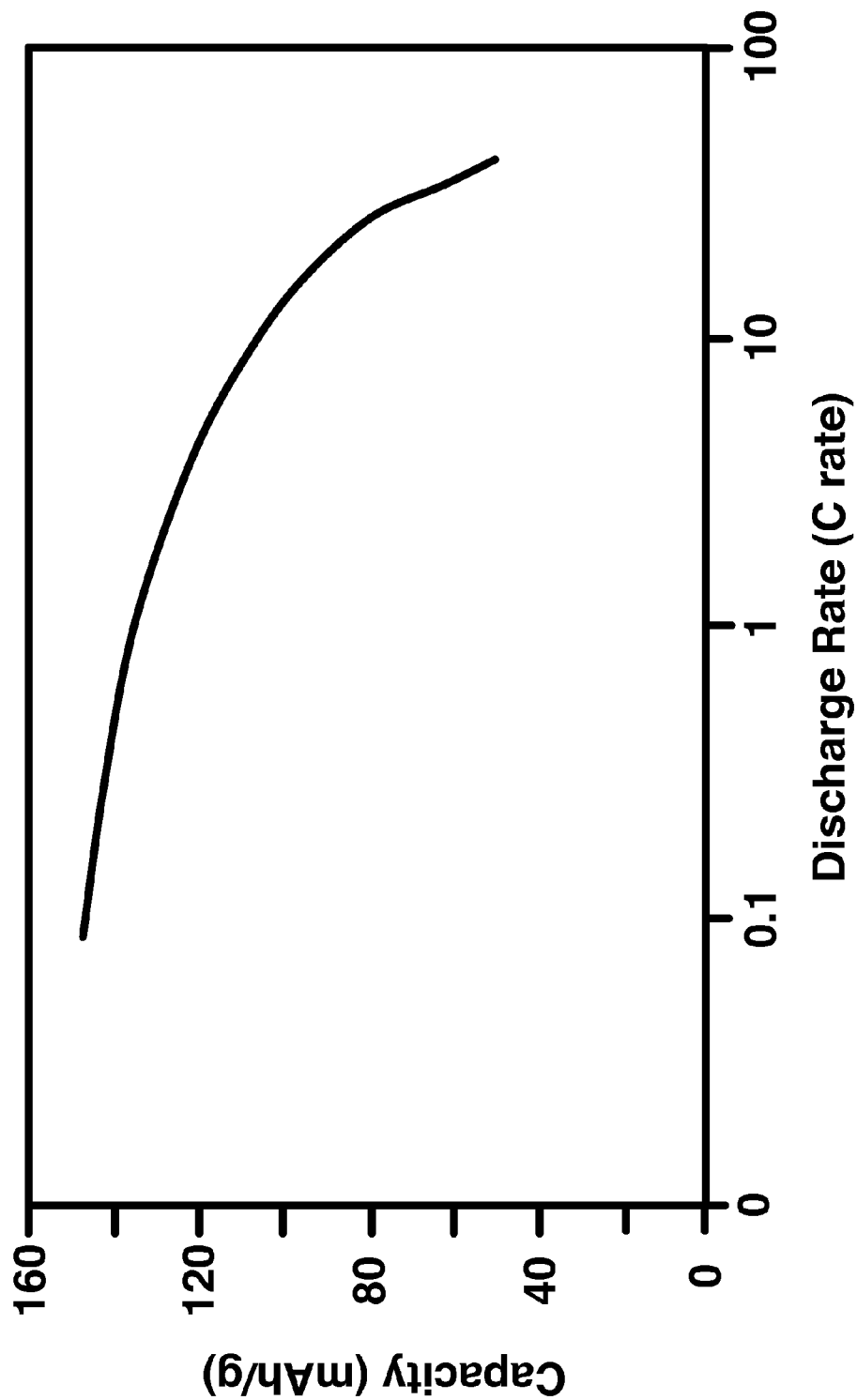
FIG. 10 represents battery power capability (ragone plot), determined at room temperature, for a Li/1M $LiPF_6$ EC:DEC 3:7/carbon-deposited lithium iron zirconium phosphosilicate battery. Capacity (in mAh/g) is indicated on Y axis and discharge rate (C-rate; a 1 C rate corresponding to discharge of full capacity in 1 hour) is indicated on X axis, initial capacity is determined by slow-scan voltammetry. Battery has been prepared with a positive electrode containing a carbon-deposited lithium iron zirconium phosphosilicate embodiment of the present invention, at an atomic ratio Li:Fe:Zr:P:Si=1: 0.95:0.05:0.95:0.05, prepared in example 5.
Figure 11:
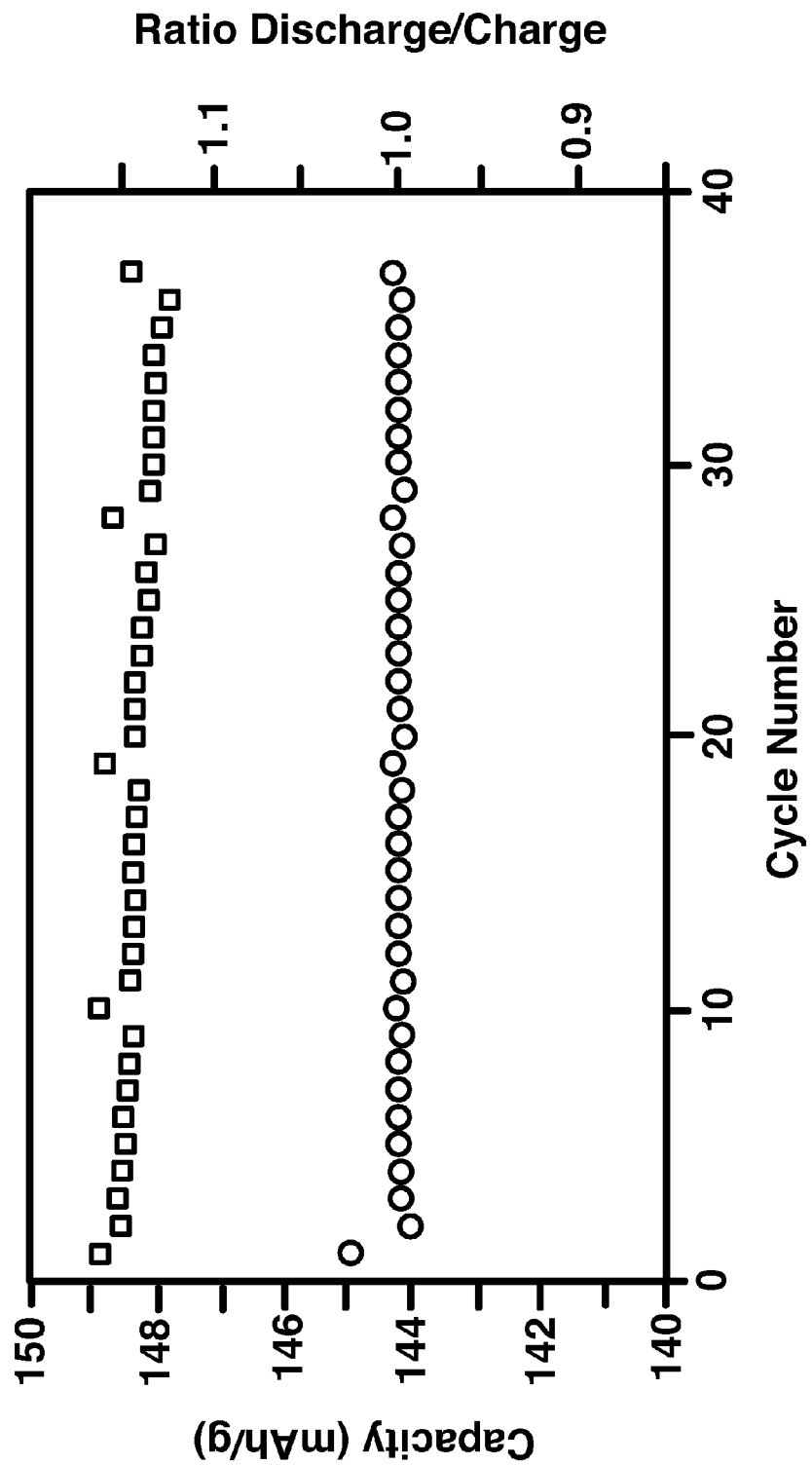
FIG. 11 illustrates cycling capability, determined at 60° C. and C/4 discharge rate, for a Li/1M $LiPF_6$ EC:DEC 3:7/C—$LiFePO_4$ carbon-deposited lithium iron zirconium phosphosilicate battery. Battery capacity (in mAh/g) is indicated on Y axis and cycle number is indicated on X axis, initial capacity is determined by slow-scan voltammetry. Battery has been prepared with a positive electrode containing a carbon-deposited lithium iron zirconium phosphosilicate embodiment of the present invention, at an atomic ratio Li:Fe:Zr:P:Si=1: 0.95:0.05:0.95:0.05, prepared in example 5. The square represent the battery capacity and the circles represent the ratio charge/discharge.

The experiment has been repeated with similar results, with the following precursors: iron oxalate dihydrate (576.19 g) serving as an iron source, $Li_2CO_3$ (12.46 g) serving as a lithium source, $LiH_2PO_4$ (315.36 g) serving as a phosphorus (P) and lithium source, tetraethyl orthosilicate $Si(OC_2H_5)_4$ (70.23 g) serving as a silicon (Si) source, Zr(IV) acetate hydroxide (35.76 g) serving as a $Zr^{4+}$ source, at an atomic ratio of Li:Fe:Zr:P:Si=1:0.95:0.05:0.9:0.1, stearic acid (13.7 g) and grade M 5005 micronized polyethylene wax powders (13.7 g, manufactured by Marcus Oil & Chemical), both as a carbon source. The X-ray spectrum of the resulting carbon-deposited lithium iron zirconium phosphosilicate, provided in FIG. 6, shows a unit cell volume of 291.6 $Å^3$.

Example 6

2-Step High-Energy Milling and 2-Step Solid-State Reaction, Low Temperature

LiOH serving as lithium source, $FePO_4$ serving as an iron source and phosphorus (P) source, yttrium(III) 2-ethylhexanoate serving as a $Y^{3+}$ source, $(NH_4)_2HPO_4$ serving as a phosphorus (P) source, tetraethyl orthosilicate $Si(OC_2H_5)_4$ serving as a silicon (Si) source, at an atomic ratio Li:Fe:Y:P:Si=1:0.95:0.05:0.95:0.05, stearic acid (2.5 wt. % of precursors) and grade M 5005 micronized polyethylene wax powders (2.5 wt. % of precursors), both as a carbon source were high-energy milled in a SPEX Mill and heat treated as described in example 4. Carbon-deposited lithium iron yttrium phosphosilicate was thus obtained.

The experiment has been repeated with similar results by replacing yttrium(III) 2-ethylhexanoate by aluminum 2,4-pentanedionate as a $Al^{3+}$ source, at an atomic ratio of Li:Fe:Al:P:Si=1:0.95:0.05:0.95:0.05. Carbon-deposited lithium iron aluminum phosphosilicate was thus obtained.

Example 7

2-Step High-Energy Milling and 2-Step Solid-State Reaction, Low Temperature LiOH serving as lithium source, iron oxalate dihydrate serving as an iron source, MnO serving as a manganese source, Zr(IV) acetate hydroxide serving as a $Zr^{4+}$ source, $(NH_4)_2HPO_4$ serving as a phosphorus (P) source, tetraethyl orthosilicate $Si(OC_2H_5)_4$ serving as a silicon (Si) source, at an atomic ratio Li:Fe:Mn:Zr:P:Si=1:0.8:0.15:0.05:0.9:0.1, stearic acid (2.5 wt. % of precursors) and grade M 5005 micronized polyethylene wax powders (2.5 wt. % of precursors), both as a carbon source were high-energy milled in a SPEX Mill and heat treated as described in example 4. Carbon-deposited lithium iron manganese zirconium phosphosilicate was thus obtained.

The experiment has been repeated with similar results using the same precursors but at an atomic ratio of Li:Fe:Mn:Zr:P:Si=1:0.5:0.45:0.05:0.9:0.1 and also at an atomic ratio of Li:Fe:Mn:Zr:P:Si=1:0.2:0.75:0.05:0.9:0.1. In both cases, carbon-deposited lithium iron manganese zirconium phosphosilicate was thus obtained.

Example 8

2-Step High-Energy Milling and 2-Step Solid-State Reaction, Low Temperature $Li_2CO_3$ serving as lithium source, $Na_2CO_3$ serving as sodium source, iron oxalate dihydrate serving as an iron source, Zr(IV) acetate hydroxide serving as a $Zr^{4+}$ source, $LiH_2PO_4$ serving as a phosphorus (P) source and lithium source, tetraethyl orthosilicate $Si(OC_2H_5)_4$ serving as a silicon (Si) source, at an atomic ratio Li:Na:Fe:Zr:P:Si=0.95:0.05:0.95:0.05:0.9:0.1, stearic acid (2.5 wt. % of precursors) and grade M 5005 micronized polyethylene wax powders (2.5 wt. % of precursors), both as a carbon source were high-energy milled in a SPEX Mill and heat treated as described in example 4. Carbon-deposited lithium sodium iron zirconium phosphosilicate was thus obtained.

The experiment has been repeated with similar results using the same precursors but at an atomic ratio of Li:Na:Fe:Zr:P:Si=0.85:0.15:0.95:0.05:0.9:0.1 and also at an atomic ratio of Li:Na:Fe:Zr:P:Si=0.75:0.25:0.95:0.05:0.9:0.1. In both cases, carbon-deposited lithium sodium iron zirconium phosphosilicate was thus obtained.

Example 9

2-Step High-Energy Milling and 2-Step Solid-State Reaction, Low Temperature $Li_2CO_3$ serving as lithium source, iron oxalate dihydrate serving as an iron source, Zr(IV) acetate hydroxide serving as a $Zr^{4+}$ source, $LiH_2PO_4$ serving as a phosphorus (P) source and lithium source, tetraethyl orthosilicate $Si(OC_2H_5)_4$ serving as a silicon (Si) source, at an atomic ratio Li:Fe:Zr:P:Si=1.03:0.95:0.05:0.9:0.1, stearic acid (1.5 wt. % of precursors) and grade M 5005 micronized polyethylene wax powders (1.5 wt. % of precursors), both as a carbon source were high-energy milled in a SPEX Mill and heat treated as described in example 4. Carbon-deposited lithium iron zirconium phosphosilicate was thus obtained.

The experiment has been repeated with similar results using the same precursors at an atomic ratio of Li:Fe:Zr:P:Si=0.97:0.95:0.05:0.9:0.1. Carbon-deposited lithium iron zirconium phosphosilicate was thus obtained.

Example 10

2-Step High-Energy Milling and 2-Step Solid-State Reaction, Low Temperature $Li_2CO_3$ serving as lithium source, iron oxalate dihydrate serving as an iron source, niobium(V) ethoxide serving as a $Nb^{5+}$ source, $LiH_2PO_4$ serving as a phosphorus (P) source and lithium source, tetraethyl orthosilicate $Si(OC_2H_5)_4$ serving as a silicon (Si) source, at an atomic ratio Li:Fe:Nb:P:Si=1:0.97:0.03:0.91:0.09, stearic acid (2 wt. % of precursors) and grade M 5005 micronized polyethylene wax powders (2 wt. % of precursors), both as a carbon source were high-energy milled in a SPEX Mill and heat treated as described in example 4. Carbon-deposited lithium iron niobium phosphosilicate was thus obtained.

The experiment has been repeated with similar results by replacing niobium(V) ethoxide by tantalum(V) butoxide as a $Ta^{5+}$ source, at an atomic ratio of Li:Fe:Ta:P:Si=1:0.98:0.02:0.94:0.06. Carbon-deposited lithium iron tantalum phosphosilicate was thus obtained.

Example 11

2-Step High-Energy Milling and 2-Step Solid-State Reaction, Low Temperature $Li_2CO_3$ serving as lithium source, iron oxalate dihydrate serving as an iron source, cobalt(II) oxalate dihydrate serving as a cobalt source, Zr(IV) acetate hydroxide serving as a $Zr^{4+}$ source, $LiH_2PO_4$ serving as a phosphorus (P) source and lithium source, tetraethyl orthosilicate $Si(OC_2H_5)_4$ serving as a silicon (Si) source, at an atomic ratio Li:Fe:Co:Zr:P:Si=1:0.9:0.05:0.05:0.9:0.1, stearic acid (2.5 wt. % of precursors) and grade M 5005 micronized polyethylene wax powders (2.5 wt. % of precursors), both as a carbon source were high-energy milled in a SPEX Mill and heat treated as described in example 4. Carbon-deposited lithium iron cobalt zirconium phosphosilicate was thus obtained.

The experiment has been repeated with similar results by replacing cobalt(II) oxalate dihydrate by nickel oxalate dihydrate as a nickel source, at an atomic ratio of Li:Fe:Ni:Zr:P:Si=1:0.9:0.05:0.05:0.9:0.1. Carbon-deposited lithium iron nickel zirconium phosphosilicate was thus obtained.

Example 12

2-Step High-Energy Milling and 2-Step Solid-State Reaction, Low Temperature $Li_2CO_3$ serving as lithium source, iron oxalate dihydrate serving as an iron source, MnO serving as a manganese source, magnesium acetylacetonate dihydrate as magnesium source, Zr(IV) acetate hydroxide serving as a $Zr^{4+}$ source, $LiH_2PO_4$ serving as a phosphorus (P) source and lithium source, tetraethyl orthosilicate $Si(OC_2H_5)_4$ serving as a silicon (Si) source, at an atomic ratio Li:Fe:Mn:Mg:Zr:P:Si=1:0.8:0.1:0.05:0.05:0.9:0.1, stearic acid (2.5 wt. % of precursors) and grade M 5005 micronized polyethylene wax powders (2.5 wt. % of precursors), both as a carbon source were high-energy milled in a SPEX Mill and heat treated as described in example 4. Carbon-deposited lithium iron manganese magnesium zirconium phosphosilicate was thus obtained.

The experiment has been repeated with similar results using the same precursors but at an atomic ratio of Li:Fe:Mn: Mg:Zr:P:Si=1:0.45:0.45:0.05:0.05:0.9:0.1 and also at an atomic ratio of Li:Fe:Mn:Mg:Zr:P:Si=1:0.2:0.7:0.05:0.05: 0.9:0.1. In both cases, carbon-deposited lithium iron manganese magnesium zirconium phosphosilicate was thus obtained.

Example 13

2-Step High-Energy Milling and 2-Step Solid-State Reaction, Low Temperature

Iron oxalate dihydrate (590.11 g) serving as an iron source, $Li_2CO_3$ (6.38 g) serving as a lithium source, $LiH_2PO_4$ (340.92 g) serving as a phosphorus (P) and lithium source, tetraethyl orthosilicate $Si(OC_2H_5)_4$ (35.96 g) serving as a silicon (Si) source, Zr(IV) acetate hydroxide (36.63 g) serving as a $Zr^{4+}$ source, at an atomic ratio of Li:Fe:Zr:P:Si=1:0.95:0.05:0.95: 0.05, stearic acid (9.13 g) and grade M 5005 micronized polyethylene wax powders (9.13 g, manufactured by Marcus Oil & Chemical), both as a carbon source, were charged in a high-energy ball milling vertical agitation Attritor® (Union Process 1-S) containing 10 kg of yttrium-stabilized $ZrO_2$ beads (10 mm diameter) as milling media. The Attritor® was then operated during 2 hours at a speed of 350 rpm. The resulting high-energy milled mixture was then heated at about 300° C. for about 1 hour under nitrogen atmosphere. Gaseous products evolved during this thermal step. The resulting product, stearic acid (4.57 g) and grade M 5005 micronized polyethylene wax powders (4.57 g), both as a carbon source, were then high-energy milled for about one hour in Attritor®. The resulting high-energy milled amorphous precursor was then heated at about 570° C. for about 6 hours under humid nitrogen gas (bubbled in water at around 80° C.), dry nitrogen gas is used during heating step (around 90 mn) and cooling step (around 180 mn). Carbon-deposited lithium iron zirconium phosphosilicate was thus obtained.

Example 14

Electrochemical Characterization

Liquid electrolyte batteries were prepared according to the following procedure.

A cathode material of the present invention, PVdF-HFP copolymer (supplied by Atochem), and EBN-1010 graphite powder (supplied by Superior Graphite) were ball milled in a jar mill with zirconia beads in N-methylpyrrolidone (NMP) for 10 hours in order to obtain a dispersion composed of the cathode/PVdF-HFP/graphite 80/10/10 by weight mixture. The mixture obtained was subsequently deposited, using a Gardner® device, on a sheet of aluminum carrying a carbon-treated coating (supplied by Exopack Advanced Coating) and the film deposited was dried under vacuum at 80° C. for 24 hours and then stored in a glovebox. A battery of the "button" type was assembled and sealed in a glovebox, use being made of the carbon-treated sheet of aluminum carrying the coating comprising the carbon-deposited alkali metal phosphosilicate, as cathode, a film of lithium, as anode, and a separator having a thickness of 25 μm (supplied by Celgard) impregnated with a 1M solution of $LiPF_6$ in an EC/DEC 3/7 mixture.

The batteries were subjected to scanning cyclic voltammetry at ambient temperature with a rate of 20 mV/80 s using a VMP2 multichannel potentiostat (Biologic Science Instruments), first in oxydation from the rest potential up to 4 V and then in reduction between 4 and 2.2 V. Voltammetry was repeated a second time and capacity of the cathode material (C in mAh/g) determined from the second reduction cycle.

Some batteries were subjected to C/12 galvanostatic cycling at 60° C. between 2.2 and 4 Volt.

Some batteries were subjected to power capability test at ambient temperature (ragone plot), by determining capacity (in mAh/g) at different discharge rate (C-rate; a 1 C rate corresponding to discharge of full capacity in 1 hour).

The following clauses provide a further description of examples of a process in accordance with the present invention:

CLAUSES

1. A process for the synthesis of a carbon-deposited alkali metal oxyanion cathode material comprising particles, wherein said particles carry, on at least a portion of the particle surface, carbon deposited by pyrolysis, said process comprising:

a first dry high-energy milling step performed on precursors of said carbon-deposited alkali metal oxyanion prior to a first solid-state thermal reaction, wherein said first solid-state thermal reaction produces a first solid-state thermal reaction product; and a second dry high-energy milling step performed on said product prior to a second solid-state thermal reaction.

2. The process of clause 1, wherein said process comprises adding a source compound of carbon to said precursors prior to or during said first high-energy milling step and/or to said product prior to or during said second high-energy milling step.

3. The process of clause 2, wherein said carbon source is a liquid, solid or gaseous hydrocarbon.

4. The process of clause 3, wherein said carbon source is selected from the group consisting of polycyclic aromatic entities, perylene and its derivatives, polyhydric compounds, cellulose, starch and their esters and ethers, polyolefins, polybutadienes, polyvinyl alcohol, condensation products of phenols, and polymers derived from furfuryl alcohol, from styrene, from divinylbenzene, from naphthalene, from perylene, from acrylonitrile and from vinyl acetate.

5. The process of clause 4, wherein said polycyclic aromatic entities are selected from the group consisting of tar and pitch.

6. The process of clause 4, wherein said polyhydric compounds are selected from the group consisting of sugars, carbohydrates, and their derivatives.

7. The process of any one of clauses 1 to 6, wherein said precursors comprise at least one source compound of an alkali metal, at least one source compound of Fe and/or Mn; at least one source compound of a metal M', where M' is a 2+ or more metal in the carbon-deposited alkali metal oxyanion; and at least one source compound of an oxyanion, if the oxyanion is not present in another source compound.

8. The process of clause 7, wherein said source of oxyanion comprises a source compound of phosphorus (P), if the element P is not present in another source compound; and at least one source compound of silicon (Si)

9. The process of clause 7 or clause 8, wherein said source compound of M is selected from the group consisting of iron(III) oxide, magnetite ($Fe_3O_4$), trivalent iron phosphate, lithium iron hydroxyphosphate, trivalent iron nitrate, ferrous phosphate, vivianite $Fe_3(PO_4)_2$, iron acetate $(CH_3COO)_2Fe$, iron sulfate ($FeSO_4$), iron oxalate, ammonium iron phosphate ($NH_4FePO_4$), and any combinations thereof.

10. The process of any one of clauses 7 to 9, wherein said source compound of M is selected from the group consisting of MnO, MnO$_2$, manganese acetate, manganese oxalate, manganese sulfate, manganese nitrate, and any combinations thereof.

11. The process of any one of clauses 7 to 10, wherein said source compound of alkaline metal is selected from the group consisting of lithium oxide, lithium hydroxide, lithium carbonate, Li$_3$PO$_4$, LiH$_2$PO$_4$, lithium ortho-, meta- or polysilicates, lithium sulfate, lithium oxalate, lithium acetate, and any combinations thereof.

12. The process of any one of clauses 7 to 11, wherein said source compound of P is selected from the group consisting of phosphoric acid and its esters, Li$_3$PO$_4$, LiH$_2$PO$_4$, monoammonium or diammonium phosphates, trivalent iron phosphate, manganese ammonium phosphate, and any combinations thereof.

13. The process of any one of clauses 7 to 12, wherein said source compound of Si is selected from the group consisting of tetra orthosilicate, nanosized SiO$_2$, Li$_2$SiO$_3$, Li$_4$SiO$_4$, and any combinations thereof.

14. The process of any one of clauses 7 to 12, wherein said source compound of a 2+ or more valency metal is a source compound of a 4+ valency metal selected from the group consisting of Zr$^{4+}$, Ti$^{4+}$, Nb$^{4+}$, Mo$^{4+}$, Ge$^{4+}$, Ce$^{4+}$ and Sn$^{4\pm}$.

15. The process of clause 14, wherein said 4+ valency metal is Zr$^{4+}$ and said source compound is selected from the group consisting of zirconium acetate hydroxide, zirconium alkoxide, and a combination thereof.

16. The process of any one of clauses 7 to 15, wherein said source compounds are selected to provide after said second thermal treatment a cathode material having alkali metal:M:M':P:Si ratios of about 1:1:0.7 to 1:>0 to 0.3.

17. The process of any one of clauses 1 to 16, wherein said high-energy milling steps are performed with a milling apparatus selected from the group consisting of a high-energy ball mill, a pulverizing mixer mill, a planetary ball mill, a drum/ball-mill, a shaker mill, a stirred ball mill, a mixer ball mill, a vertical attritor, and a horizontal attritor.

18. The process of any one of clauses 1 to 17, wherein said first solid-state thermal step is operated at a temperature selected from the range of temperatures between about 200° C. and about 600° C.

19. The process of any one of clauses 1 to 18, wherein said second solid-state thermal step is operated at a temperature selected from the range of temperatures between about 400° C. and about 800° C.

20. The process of any one of clauses 1 to 18, wherein said first and/or second solid-state thermal step(s) is performed under an inert or reductive atmosphere.

21. The process of any one of clauses 1 to 20, wherein said first and/or second high-energy milling step(s) is performed under an inert or reductive atmosphere.

22. The process of clause 20 or 21, wherein said reductive atmosphere participates in the reduction or prevents the oxidation of the oxidation state of at least one metal in the precursors without full reduction to an elemental state.

23. The process of any one of clauses 20 to 22, wherein said reductive atmosphere comprises an externally applied reductive atmosphere, a reductive atmosphere derived from the degradation of a compound, a reductive atmosphere derived from the synthesis reaction, or any combinations thereof.

24. The process of clause 23, wherein said externally applied reductive atmosphere comprises CO, H$_2$, NH$_3$, HC, and any combinations thereof, wherein HC is a hydrocarbon or carbonaceous product.

25. The process of clause 23 or 24, wherein said reductive atmosphere derived from the degradation of a compound comprises a reductive atmosphere which is produced when the compound is degraded or is transformed under heat.

26. The process of clause 23, wherein said reductive atmosphere derived from the degradation of a compound comprises CO, CO/CO$_2$, H$_2$ or any combinations thereof.

27. The process of any one of clauses 1 to 24, wherein said precursors comprise FePO$_4$, iron oxalate, Li$_2$CO$_3$, tetraethyl orthosilicate and Zr(IV) acetate hydroxide.

28. A process for the synthesis of a carbon-deposited phosphosilicate cathode material comprising particles of a compound corresponding to the general formula AM$_{1-x}$M'$_x$(XO$_4$)$_{1-x}$(SiO$_4$)$_{2x}$ which carry, on at least a portion of the particle surface, carbon deposited by pyrolysis, wherein A is Li, alone or partially replaced by at most 30% as atoms of Na and/or K;

M is a metal comprising at least 90% at. of Fe(II), or Mn(II), or a mixture thereof;

M' is at least one 2+ or more valency metal;

XO$_4$ is PO$_4$, alone or partially replaced by at most 30 mol % of SO$_4$; and 0.05≤x≤0.15 said process comprising reacting precursors of said compound in at least one solid-state thermal step and wherein at least one high-energy milling step is performed on said reacting precursors prior to said at least one thermal step.

29. The process according to clause 28, wherein said precursors comprise a) at least one source compound of A;

b) at least one source compound of M;

c) at least one source compound of M';

d) at least one source compound of P, if the P is not in another source compound; and e) at least one source compound of Si, if the Si is not in another source compound.

30. A process for the synthesis of an alkali metal oxyanion cathode material comprising particles, wherein said particles carry, on at least a portion of the particle surface, carbon deposited by pyrolysis, said process comprising a first high-energy milling step performed on precursors of said alkali metal oxyanion prior to a first solid-state thermal reaction.

31. A process as defined in clause 30, wherein said first solid-state thermal reaction produces a first solid-state thermal reaction product; and wherein a second high-energy milling step is performed on said product prior to a second solid-state thermal reaction.

32. A process as defined in any of clauses 30 and 31, wherein said precursors comprise:

a) at least one source compound of an alkaline metal;

b) at least one source compound of Fe and/or Mn;

c) at least one source compound of a metal having a valence of 2+ or more;

d) at least one source compound of an oxyanion, if the oxyanion is not in another source compound; and e) a source of carbon.

33. A process as defined in clause 31, wherein said precursors comprise:

a) at least one source compound of an alkaline metal;

b) at least one source compound of Fe and/or Mn;

c) at least one source compound of a metal having a valence of 2+ or more;

d) at least one source compound of an oxyanion, if the oxyanion is not in another source compound; and e) a source of carbon, wherein said source compounds are totally present in said first thermal step, or any part thereof is present in each of the first and second thermal step.

The person skilled in the art will understand that while the working examples illustrate an embodiment where the oxyanion is a phosphosilicate, other variations, modifications and refinements are possible within the spirit and scope of the present invention. For example, U.S. Pat. No. 6,085,015, which is herein incorporated by reference in its entirety, discloses that the orthosilicate anion being isosteric with the sulfate, phosphate, germanate and vanadate anions, the corresponding elements can easily replace silicon in this types of structure, as does boron and aluminum, offering a wide choice of materials with complete control of the charge density on the anionic sites. Another example, U.S. Pat. No. 6,514,640 which is herein incorporated by reference in its entirety, discloses "isocharge substitutions" that refers to substitution of one element on a given crystallographic site with an element having a similar charge. For example, $Mg^{2+}$ is considered similarly isocharge with $Fe^{2+}$ and $V^{5+}$ is similarly isocharge with $P^{5+}$. Likewise, $(PO_4)_3$ tetrahedra can be substituted with $(VO_4)_3$ tetrahedra. "Aliovalent substitution" refers to substitution of one element on a given crystallographic site with an element of a different valence or charge. One example of an aliovalent substitution would be $Cr^{3+}$ or $Ti^{4+}$ on an $Fe^{2+}$ site.

The above description of the embodiments should not be interpreted in a limiting manner since other variations, modifications and refinements are possible within the spirit and scope of the present invention. The scope of the invention is defined in the appended claims and their equivalents.

All of the compositions and/or process disclosed and claimed herein can be made and executed without undue experimentation in light of the present disclosure. While the compositions and process of this invention have been described in terms of preferred embodiments, it will be apparent to those of skill in the art that variations can be applied to the compositions and/or process and in the steps or in the sequence of steps of the process described herein without departing from the concept, spirit and scope of the invention. All such similar substitutes and modifications apparent to those skilled in the art are deemed to be within the spirit, scope and concept of the invention as defined by the appended claims.

All of the references cited in this document are hereby each incorporated herein by reference in their entirety.

The invention claimed is:

1. A process for the synthesis of phosphosilicate cathode material particles having a deposit of carbon on at least a portion of the surface thereof, said phosphosilicate material comprising lithium and Fe, said Fe being doped with a 4+ valence state metal M', said process comprising:
   a first dry high-energy milling step performed on precursors of said cathode material;
   a first solid-state thermal reaction;
   a second dry high-energy milling step; and
   a second solid-state thermal reaction.

2. The process of claim 1, wherein said first solid-state thermal reaction is operated at a temperature selected from the range of temperatures of from about 200° C. to about 600° C.

3. The process of claim 1, wherein said second solid-state thermal reaction is operated at a temperature selected from the range of temperatures of from about 400° C. to about 800° C.

4. The process of claim 1, wherein said first and/or second high-energy milling step is performed during a time period selected from the range of from about 5 minutes to about 4 hours.

5. The process of claim 1, further comprising a subsequent flash thermal treatment which is operated at a temperature selected from the temperature range of from about 650° C. to about 900° C.

6. The process of claim 1, wherein said precursors include a source compound of carbon for obtaining the deposit of carbon.

7. The process of claim 6, wherein said source compound of carbon is a liquid, solid or gaseous hydrocarbon.

8. The process of claim 1, wherein said Fe is doped with from 3 atomic % to 15 atomic % of the 4+ valence state M'.

9. The process of claim 1, wherein said precursors comprise at least one source compound of lithium, at least one source compound of Fe; at least one source compound of said 4+ valence state metal M'; at least one source compound of phosphorus; at least one source compound of silicon; and at least one source of carbon.

10. The process of claim 9, wherein said at least one source compound of Fe is selected from the group consisting of iron, iron(III) oxide, magnetite ($Fe_3O_4$), trivalent iron phosphate, lithium iron hydroxyphosphate, trivalent iron nitrate, ferrous phosphate, vivianite $Fe_3(PO_4)_2$, iron acetate $(CH_3COO)_2Fe$, iron sulfate ($FeSO_4$), iron oxalate, iron(III) nitrate, iron(II) nitrate, $FeCl_3$, $FeCl_2$, FeO, ammonium iron phosphate ($NH_4FePO_4$), $Fe_2P_2O_7$, ferrocene, and any combinations thereof.

11. The process of claim 9, wherein said at least one source compound of lithium is selected from the group consisting of lithium oxide, lithium hydroxide, lithium carbonate, $Li_3PO_4$, $LiH_2PO_4$, $LiNaHPO_4$, $LiKHPO_4$, $Li_2HPO_4$, lithium ortho-, meta- or polysilicates, lithium sulfate, lithium oxalate, lithium acetate, and any combinations thereof.

12. The process of claim 9, wherein said at least one source compound of silicon is selected from the group consisting of organosilicon, silicon alkoxides, tetraalkyl orthosilicate, tetraethyl orthosilicate, nanosized $SiO_2$, $Li_2SiO_3$, $Li_4SiO_4$, and any combinations thereof.

13. The process of claim 1, wherein said M' is selected from the group consisting of $Zr^{4+}$, $Ti^{4+}$, $Nb^{4+}$, $Mo^{4+}$, $Ge^{4+}$, $Ce^{4+}$ and $Sn^{4+}$.

14. The process of claim 1, wherein said M' is $Zr^{4+}$.

15. The process of claim 14, wherein said at least one source compound of M' is selected from the group consisting of zirconium acetate hydroxide, zirconium alkoxide, n-butyl zirconate, zirconium(IV) acetylacetonate, zirconium(IV) ethoxide, zirconium(IV) hydrogenphosphate, zirconium(IV) silicate and any combinations thereof.

16. The process of claim 14, wherein said source compounds are selected to provide a cathode material having a general element ratios Li:(Fe+Zr):$PO_4$:$SiO_4$ of about 1:1:0.7 to less than 1: more than 0 to 0.3.

17. The process of claim 1, wherein said second dry high-energy milling step produces a substantially amorphous material.

18. The process of claim 1, wherein said first and/or second solid-state thermal reactions is performed under an inert or reductive atmosphere.

19. The process of claim 1, wherein said precursors comprise at least $FePO_4$ and $Li_2CO_3$.

20. The process of claim 1, said material further comprising Mn.

* * * * *